United States Patent
Afram

(10) Patent No.: US 11,623,148 B2
(45) Date of Patent: *Apr. 11, 2023

(54) CONTROLLING A USER INTERFACE PROVIDING A GAMEBOARD AND TILES

(71) Applicant: KING.COM LIMITED, St. Julians (MT)

(72) Inventor: Issa Afram, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,231

(22) Filed: Oct. 19, 2021

(65) Prior Publication Data

US 2022/0105430 A1 Apr. 7, 2022

Related U.S. Application Data

(63) Continuation of application No. 16/862,013, filed on Apr. 29, 2020, now Pat. No. 11,154,780.

(60) Provisional application No. 62/979,510, filed on Feb. 21, 2020.

(51) Int. Cl.
A63F 13/537 (2014.01)
(52) U.S. Cl.
CPC .................................. *A63F 13/537* (2014.09)
(58) Field of Classification Search
CPC ......... A63F 13/537; A63F 13/10; A63F 13/45
See application file for complete search history.

(56) References Cited

U.S. PATENT DOCUMENTS

2014/0235338 A1 8/2014 Hansson et al.
2016/0220897 A1* 8/2016 Hansson ................. A63F 13/25
2019/0176024 A1 6/2019 Hansson

OTHER PUBLICATIONS

D. Maung, "Tile-based Method for Procedural Content Generation," dissertation at Ohio State University, Computer Science and Engineering, published 2016, downloaded from https://etd.ohiolink.edu/apexprod/rws_olink/r/1501/10?clear=10&p10_accession_num=osu1461077485 (Year: 2016).*
Liquipedia, "Creep," published Feb. 4, 2018 as indicated by waybackmachine.org, downloaded from https://liquipedia.net/starcraft2/Creep (2018).
YouTube Video regarding the game Starcraft, "Zerg Unit Overview," published Mar. 4, 2010, downloaded from https://www.youtube.com/watch?v=pofu5i7vUYk (2010).

\* cited by examiner

*Primary Examiner* — Eric J Yoon
(74) *Attorney, Agent, or Firm* — Saul Ewing LLP

(57) ABSTRACT

A computer device having a user interface, a processor, and computer storage. The user interface provides a gameboard comprising tiles supporting game objects, the tiles comprising predefined sets of tiles which are available to support spreading blocking elements. The processor receives a detected user input. If it detects a match condition, the processor removes the game elements of the match condition and generates and displays new game objects to replenish the gameboard. A data structure having tile data is stored in the computer storage. Tile data for tiles of the predefined set(s) comprises a set indicator which indicates whether a tile is in one of the predefined sets. If a blocker spreading mode has been triggered, the processor selects an origin tile which supports a spreading blocking element, identifies a target tile to which the spreading blocking element may spread and generates a blocking element for the target tile.

19 Claims, 14 Drawing Sheets

CONTROLLING A USER INTERFACE PROVIDING A GAMEBOARD AND TILES

CROSS-REFERENCE TO RELATED APPLICATIONS

This application is a continuation of U.S. application Ser. No. 16/862,013, filed on Apr. 29, 2020, which is based on, and claims priority to U.S. Provisional Application No. 62/979,510, filed on Feb. 21, 2020, the entire contents of which being fully incorporated herein by reference.

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

A particular challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush Saga. The game implements several different kinds of so called "blockers". Blockers (also referred to herein as blocking elements) are game elements that are in the way for the player when wanting to make matches on different areas of the gameboard. Blocking elements are unresponsive to direct user engagement, but may be removed in certain conditions. For example, if a match condition is created adjacent to them or if certain boosters are triggered by a match condition, or in other ways, which remove blocking elements.

Blockers may be spreading or non-spreading. A non-spreading blocker occupies a tile and prevents user interaction with that tile. If not removed, it will be at the same tile for the next game move. A spreading blocker may "multiply" between game moves.

A particular kind of spreading blocker in some existing games is the "chocolate" blocker. The chocolate blocker not only blocks a tile on the gameboard but also multiples (spreads) to block even larger areas of the game board between game moves. A tile with a chocolate blocker presents a visual representation of a chocolate block on the display. If a match is made next to a chocolate block then no chocolate block will multiply and that chocolate block will be removed. However, if a match is made in a game move and is not next to a chocolate block then one of the chocolate blocks on the gameboard will multiply and another tile on the game board will be filled with a chocolate blocker. The tile that receives a new chocolate blocker may be adjacent to an existing chocolate block, however, which chocolate block on the game board it will come from may seemingly be random. If all chocolate blocks on the gameboard have been removed then no new chocolate blocks will appear. Chocolate blockers cannot be swapped and change places but are stuck where they are. In some games, chocolate blockers can only spread to a tile on the gameboard that is occupied with a game element.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

The inventors have noted that, while intending to provide a player with challenges in meeting certain game objectives, the spreading of chocolate blockers can become frustrating and decrease player satisfaction.

According to an aspect of the present invention there is provided a computer device having:

a user interface configured to provide a gameboard comprising tiles supporting game objects, the game objects comprising user activatable game elements of differing characteristics, and blocking elements which are unresponsive to user engagement, the tiles comprising one or more predefined sets of tiles which are available to support spreading blocking elements, the user interface configured to detect user input when a user engages with a user activatable game element in a game move;

a processor configured to receive a detected user input with a user activatable game element, to detect a match condition of a plurality of user activatable game elements having matching characteristics, to remove the plurality of the game elements of the match game condition and to generate and display new game objects to replenish the gameboard for a next game move; and computer storage in which is stored a data structure having tile data for each tile, wherein the tile data for tiles of the one or more predefined sets comprises a set indicator which indicates whether a tile is in one of the predefined sets available to support a blocking element, wherein the processor is configured to detect that a blocker spreading mode has been triggered in the game move, to select an origin tile which supports a spreading blocking element, to identify a target tile to which the spreading blocking element may spread by querying the data structure to determine from the set indicators for the origin and target tile that they are in the same predefined set and, if so, to generate a blocking element for the target tile for the next game move.

In the embodiment described herein, the processor is configured to generate a spreading blocking element as the blocking element for the target tile. It will be appreciated however that embodiments may operate where a different kind of blocking element is generated from the target tile.

In some embodiments, the processor is configured to identify the target tile as one of the tiles adjacent the origin tile.

In some embodiments, the processor is configured, if it is determined that the origin and target tiles are not in the same predefined set, to identify an alternate target tile and to determine from the set indicators for the origin and alternate target tile that they are in the same predefined set and, if so, to generate a blocking element for the alternate target tile.

In other embodiments, the processor is configured, if it is determined that the origin and target tile are not in the same predefined set, to select an alternate origin tile and to identify a corresponding alternate target tile and to determine from the set indicators for the alternate origin and alternate target tile whether they are in the same predefined set, and if so, to generate a blocking element for the alternate target tile. The processor may be configured to select the alternate origin tile from the same predefined set as the origin tile, or from a different predefined set than the original tile.

In some embodiments, the processor is configured to select a plurality of origin tiles, each origin tile being from a respective predefined set and to generate blocking elements for corresponding respective target tiles for the next game move if it is determined that each respective origin tile and corresponding target tile are in the same set.

In some embodiments, the processor is configured to identify a set full condition in which all tiles in a predefined set support a spreading blocking element, and in such a set full condition to select an alternate origin tile from a different predefined set.

In some embodiments, the tile data of one or more tiles of the predefined sets is associated with a spreading blocking element and a user activatable game element. A visual indication may be given when a tile supports a spreading blocking element and a user activatable game element. The user activatable game element may be revealed when the blocking element is removed.

One or more tiles of the predefined sets which are available to support spreading blocking elements may be vacant.

One or more tiles of the predefined sets may support a respective non-spreading blocking element which renders that tile unavailable as a target tile.

One or more tile of the predefined sets may be visually indicated on the user interface, for example by a border or tile background or both. A predefined set may resemble a "tray" of chocolate.

The processor may be configured to detect that the blocker spreading mode has been triggered when the match condition does not cause removal of one or more spreading blocking elements from one or more tile of the predefined set (s). For example, the processor may be configured to detect that one or more of the plurality of user activatable game elements of the match condition is adjacent one or more tiles of the predefined sets which support spreading blocking elements and to remove said one or more spreading blocking element from said adjacent tiles. Alternatively, the processor may be configured to detect that activation (triggering) of a special game element has removed one or more spreading blocking elements. A special game element may be activated or triggered by being located in a match condition, or by another way such as being placed adjacent another special game element.

The user interface may be configured to provide an initial gameboard in which all tiles of the one or more predefined sets support spreading blocking elements.

In some embodiments, the processor is configured to detect an empty set condition in which spreading blocking elements have been removed from all tiles of a predefined set and to generate a visual animation to indicate the empty set condition. The processor may be configured when an empty set condition is detected, to trigger effects associated with any game objects supported by the tiles of that set.

In some embodiment described herein, the processor is configured to generate a spreading blocking element as the blocking element for the target tile. It will be appreciated, however, that embodiments may operate where a different kind of blocking element is generated for the target tile.

Another aspect of the invention provides a method of operating a computer device comprising a user interface, a processor and computer storage, the method comprising:

providing on the user interface a gameboard comprising tiles supporting game objects, the game objects comprising user activatable game elements of differing characteristics, and blocking elements which are unresponsive to user engagement, and the tiles comprising one or more predefined sets of tiles which are available to support spreading blocking elements, detecting user input at the user interface when a user engages with the user activatable game element in a game move, and performing the following steps by the processor:

receiving a detected user input with the user activatable game element, detecting a match condition of a plurality of user activatable game elements having matching characteristics, removing the plurality of the game elements of the match game condition and generating and displaying new game objects to replenish the gameboard for a next game move, detecting that a blocker spreading mode has been triggered in the game move, selecting an origin tile which supports a spreading blocking element, identifying a target tile to which the spreading blocking element may spread by querying a data structure which holds tile data for each tile, wherein the tile data for tiles of the predefined sets comprises a set indicator which indicates whether a tile is in the, or one of the, predefined sets available to support a blocking element, determining from the set indicators for the origin and target tile that they are in the same predefined set and, if so, generating a blocking element for the target tile for the next game move.

Another aspect of the invention, provides a non-transitory computer readable medium on which is stored computer readable instructions, which, when executed by one or more processors, implement the steps of the following method:

providing on a user interface a gameboard comprising tiles supporting game objects, the game objects comprising user activatable game elements of differing characteristics, and blocking elements which are unresponsive to user engagement, and the tiles comprising one or more predefined sets of tiles which are available to support spreading blocking elements, detecting user input at the user interface when a user engages with the user activatable game element in a game move, receiving a detected user input with the user activatable game element, detecting a match condition of a plurality of user activatable game elements having matching characteristics, removing the plurality of the game elements of the match game condition and generating and displaying new game objects to replenish the gameboard for a next game move, detecting that a blocker spreading mode has been triggered in the game move, selecting an origin tile which supports the spreading blocking element, identifying a target tile to which the spreading blocking element may spread by querying a data structure which holds tile data for each tile, wherein the tile data for tiles of the predefined sets comprises a set indicator which indicates whether a tile is in the, or one of the, predefined sets available to support a blocking element, determining from the set indicators for the origin and target tile that they are in the same predefined set and, if so, generating a blocking element for the target tile for the next game move.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
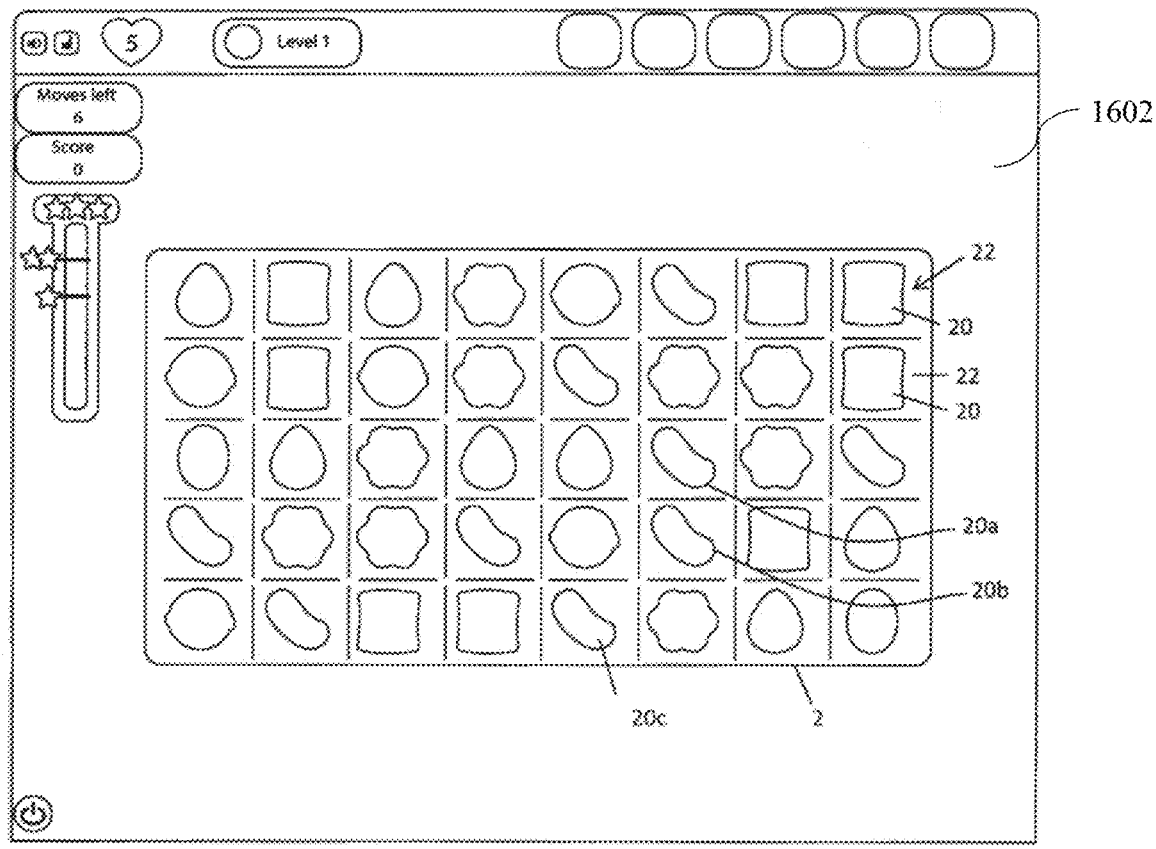
FIG. 1 shows a display of a match 3 switcher game.

FIG. 1 shows a display of a known version of a match 3 switcher game called Candy Crush Saga™. FIG. 1 illustrates a game board 2 with a plurality of game elements 20 provided on a user interface 1602 of a computer device. The game elements are each of six different shapes and colours. Each game element is supported by a tile 22. In some embodiments, the tiles are not readily visible to a player of the game—the game elements are the main focus for a player. However, the tiles govern characteristics of the game elements which are visible to a player as will be described in more detail later.

Figure 8:
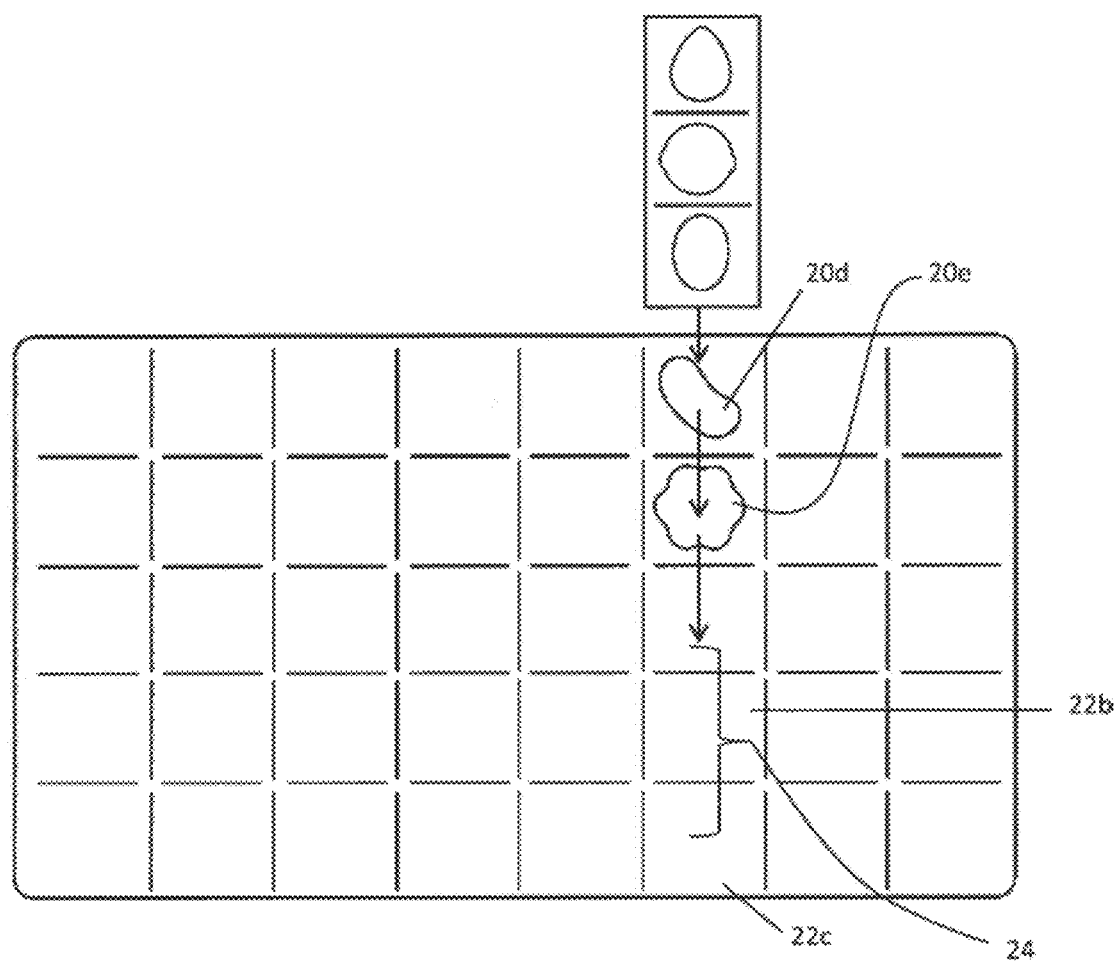
FIG. 8 shows a visual effect of removal and replacement of game elements.
Figure 9:
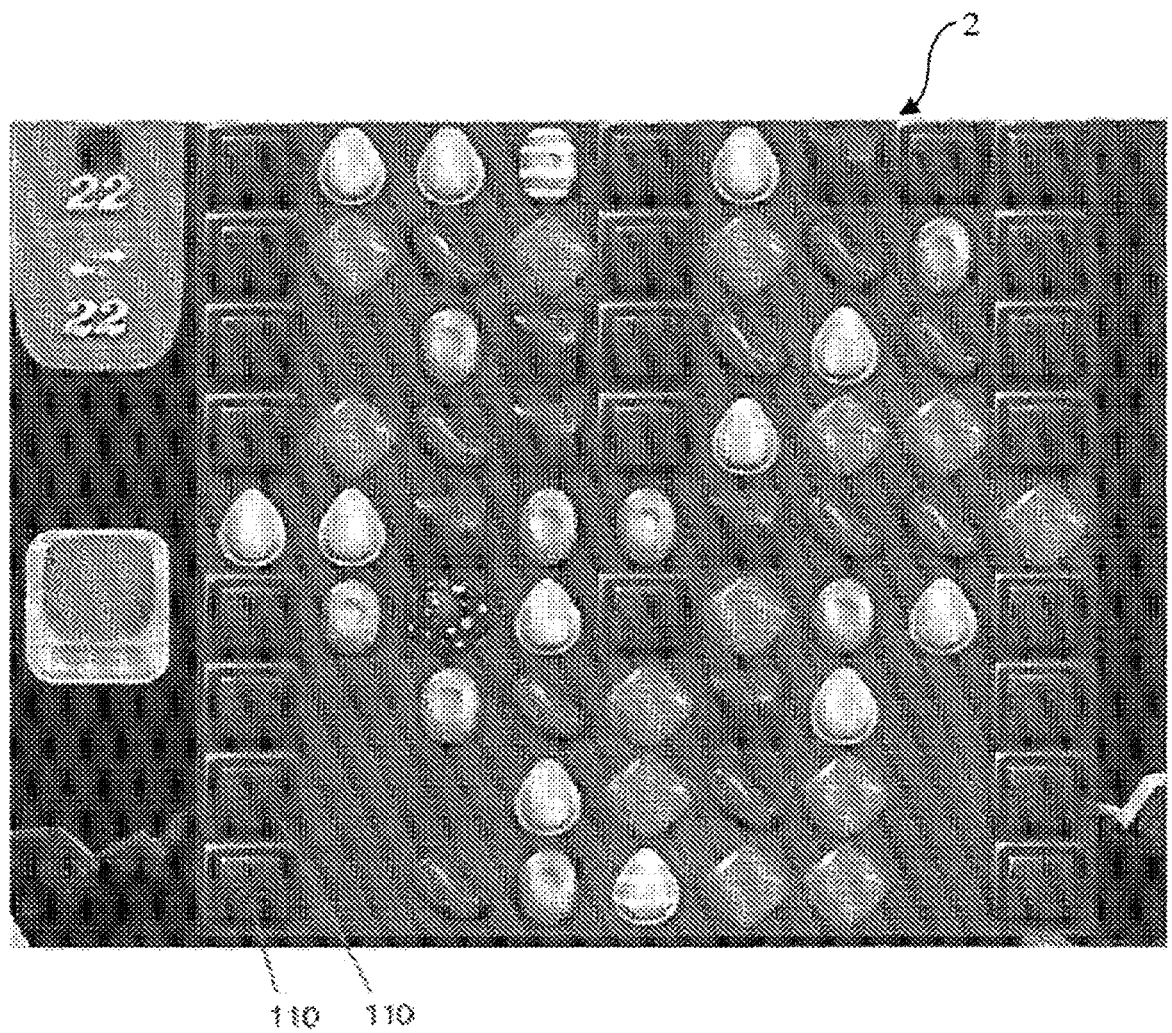
FIG. 9 shows a display with "chocolate" blockers.

In the known version of the match 3 switcher game, the aim of the game is to swop game elements in the shape of candies with each other to make moves on the game board. To gain points the player has to make moves that create matches of at least three of the same candy. In doing so, the player gains points and the matched candies are removed. As a result new candies are generated to fill any vacancies created. New candies may for example appear to fall in place from the top of the gameboard, but other effects are possible. Assume in FIG. 1 that game element 20c is moved one place to the right to form a three-line match with game elements 20a and 20b. Turning now to FIG. 8, this has the effect of game board elements 20a, 20b and 20c "disappearing", creating a visual effect (animation) on the screen to indicate the disappearance, such as a minimal explosion effect denoted 24 in FIG. 8. The two game elements which were directly above game elements 20a will now fall downwards into the spaces created by the removal of game elements 20a, 20b and 20c. Thus, game element 20e will end up at the location of tile 22c, and game element 20d will end up at the location of tile 22b. In addition, three new game elements are generated and fall downwards into the game board to fill the remaining three tiles above tile 22b. The newly generated game elements may be generated at random. The user then has a new game board on which to play a subsequent move. The match 3 switcher game may be enhanced by the inclusion of blocking elements. FIG. 9 illustrates a gameboard with a known implementation of a spreading blocker known as "chocolate". Blockers (also referred herein as blocking elements) are game elements that are in the way for the player when wanting to make matches on different areas of the gameboard. Blocking elements are unresponsive to direct user engagement, but may be removed if a match condition is created adjacent to them, or if a trigger condition is created which involves a "booster" (discussed later) which removes additional game elements or blocking elements from a gameboard.

Reference numeral 110 denotes tiles supporting a chocolate blocker (spreading blocking element)—the tiles are rendered with an appearance resembling a block of chocolate. The chocolate blocker not only blocks a tile on the gameboard but also multiples (spreads) to block even larger areas of the game board. If a match is made next to a chocolate blocker then no chocolate block will multiply and that chocolate block will be removed. However, if a match is made in a game move and is not next to a chocolate block then a blocker spreading mode is triggered such that one of the chocolate blocks on the gameboard will multiply and another tile on the game board will be populated with a chocolate blocker. The tile that receives a new chocolate block may be adjacent to an existing chocolate block, however, which chocolate block on the game board it will come from may seemingly be random. In the known arrangement of FIG. 9, the "spread" chocolate block could be anywhere within the gameboard: that is, if the blocker spreading mode is triggered, any chocolate block could be "spread" to its adjacent tile. If all chocolate blocks on the gameboard have been removed then no new chocolate blocks will appear. Chocolate blockers cannot be swapped and change places but are stuck where they are unless removed, for example by a match condition adjacent them, or by triggering special game elements. If a player fails to remove chocolate blockers in a game move, the chocolate blocker may multiply with each game move, making it difficult for a player to identify subsequent matches. The present description relates to a computer device which is configured to operate in a blocker spreading mode which remains challenging for a player but without the frustrations which can arise from the known blocker spreading mode shown in FIG. 9. The computer device and its operating modes described herein can be deployed in many different gameplay architectures. For example, a computer device can be configured by a computer game executed on the device. The game may be implemented as a computer program (e.g. game code) that is stored locally in the memory of a PC, games console, tablet or mobile telephone or other computing device. The game can be implemented as a computer program that is stored and runs entirely on one of many processors in a remote server, and data streams or updates are supplied to the client device (e.g. tablet, smartphone, etc.) to enable the client to render and display graphics and sounds.

Another possible infrastructure is a hybrid one, in which back-end servers handle some elements of the gameplay, and for instance a Java game applet is provided to client devices and it is the locally running Java applet that configures the client device to generate the graphics/sounds/user interaction for gameplay on the player's client device. Some data may be fed back to the back-end servers to enable scoring, interaction with other players and cross-platform synchronisation.

In implementations where some or all elements of game code are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

Figure 2:
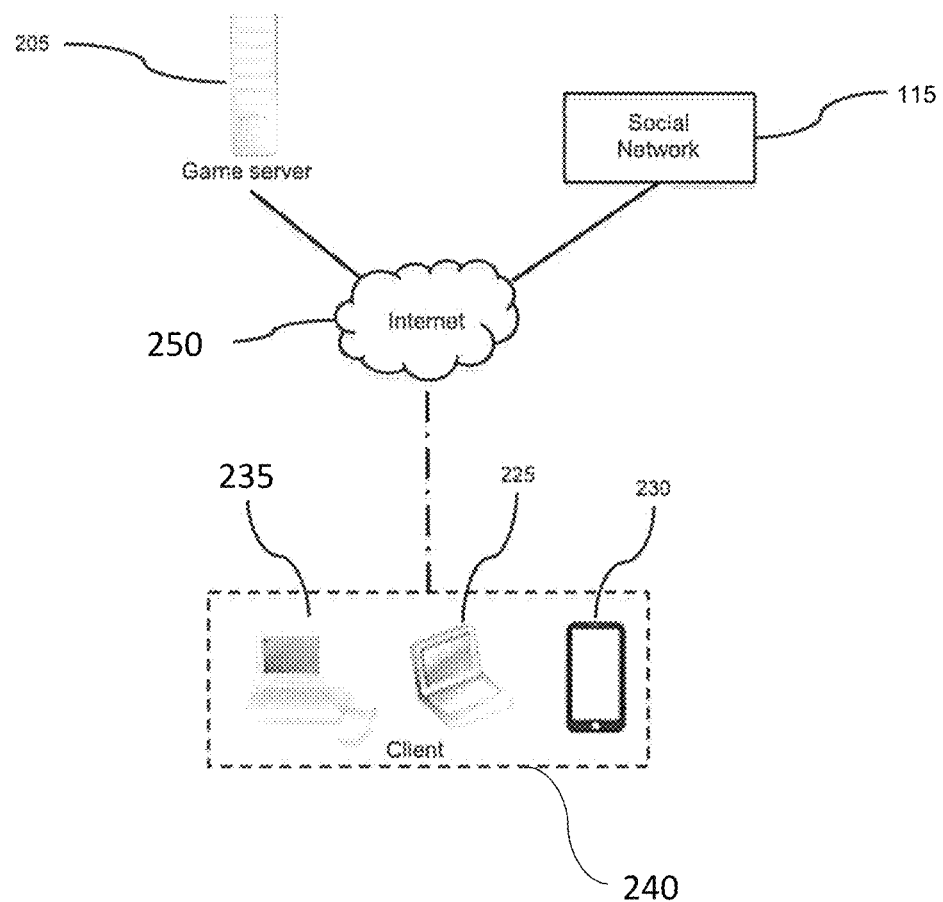
FIG. 2 is a schematic diagram of a game infrastructure.

FIG. 2 portrays an exemplary overall environment in which the computer device of the present invention can be utilized as a client device. A virtual game is stored on, for instance, a game server 205. The virtual game is to be played on the client device 240, such as a computer 235, 225 or a smartphone or other handheld device 230. The client device 240 can also be a kiosk, arcade gaming station, smart TV or other device with computing capabilities, input devices, and a screen that can present the game to a user. The client device communicates with the game server 205 and a social network server 115, for instance through the Internet 250 or other network. It should be understood that the social network server 115 and the game server 205 do not have to be located in different places, they could be on the same server or on a plurality of servers located in different locations. People skilled in the art will understand that other devices than the exemplary ones listed can also be used without departing from the scope of the invention.

The computer device may have a user interface allowing a user to interact with it in different ways depending on the capabilities of the client device 240 which the user is accessing the game with. A user can interact with the game through using a touch screen where the user can select and/or move elements on the game board with a finger or for instance with a stylus. The game can also be played with a pointing device such as a mouse or other interaction devices such as keyboard while the game is displayed to a user on a separate display of the user interface.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 3:
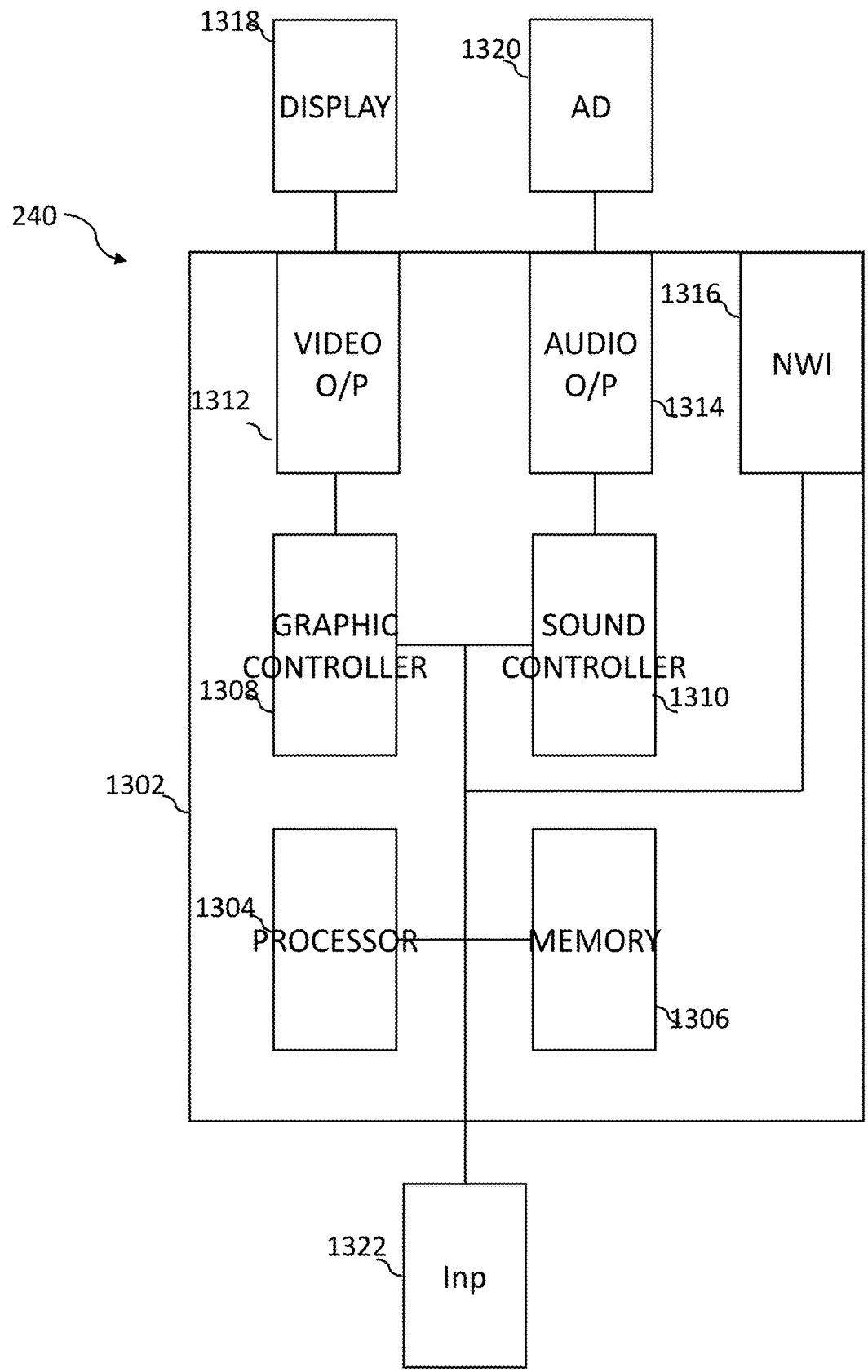
FIG. 3 is a schematic block diagram of a user device.

A schematic view of the user or computing device 240 according to an embodiment is shown in FIG. 3. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional blocks may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of a keyboard, mouse, touch screen, joystick or game controller. It should be appreciated that the display 1318 may in some embodiments also provide the input device 1322, for example, by way of an integrated touch screen.

The blocks of the controller 1302 are configured to communicate with each other via an interconnect such as a bus or any other suitable interconnect and/or by point to point communication.

It should be appreciated that, in some embodiments, the controller 1302 may be implemented by one or more circuits, at least in part.

It should be appreciated that embodiments may be deployed in different system architectures. For example, the computer device may be configured by a computer game that is stored in the memory 1306 of the user device 240. However, when online, the server 205 may handle some elements of the game in some embodiments. By way of example only, a Java game applet may be provided to the user device 240 and the locally running Java applet will generate, for example, the graphics, sounds, and user interaction for the game play on the user device 240. Java applet can have sufficient information to allow offline gameplay when the user device is no longer in communication with the game server 205, e.g. if connectivity is lost.

In some embodiments, a computer game may be implemented as a computer program that is stored in a memory system, for example the server 205, and which runs on the processor of the game server. Data streams or updates are supplied to the client device 240 to allow the user device 240 to render and display graphics and sounds in a browser of the client device 240.

Figure 10:
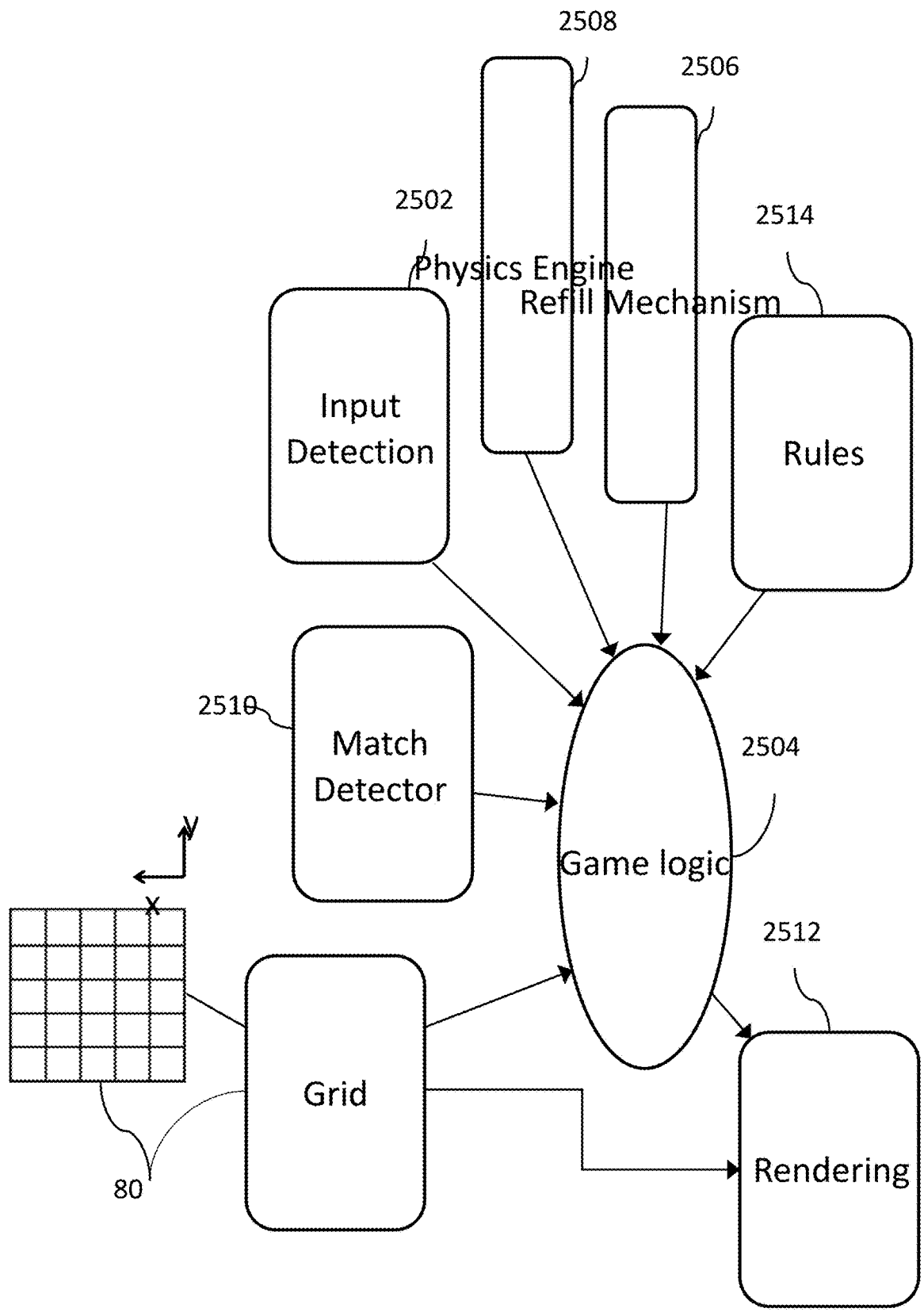
FIG. 10 is a schematic block diagram of components of a computer architecture.

FIG. 10 shows a schematic representation of the functional blocks of an embodiment of a computer device configured to implement a booster spreading mode. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. The game logic 2504 will process the information provided by the user input. The game logic 2504 may then determine if a valid selection has been made, and what the outcomes of the selection should be.

The rendering block is used to render the gameboard 2 to the user. It renders the game elements on the gameboard 2. Each time a game element moves tile location, for example, during gameboard refill, the rendering block is used to render this movement visible to the user on the display 1318 of the user device 240.

The grid component 80 stored in a memory provides a grid representation of the game board as shown schematically in FIG. 10. The grid component can be supplied by any suitable data structure, held in a local memory or remote memory accessible by the device, and is responsible for identifying each tile location on the game board and thus providing tile data including a tile ID and associated attributes about the game object displayed at that tile location. These associated attributes may then be used in combination with other components in order to control the rendering of the display, e.g. a match detector component 2510, and a refill mechanism component 2506.

Each game object has object attributes associated therewith. The object attributes may be stored in any suitable memory location. In some embodiments, the object attributes may be provided by a data structure. In some embodiments, the object attributes may be considered to be part of the game logic and in other embodiments may be considered to be outside the game logic. The object attributes may provide information as to the properties of a game object. These properties can include information of type/characteristic such as colour and/or whether or not a game object has a particular function such as a booster function or blocker function.

The game logic 2504 will determine the game objects selected by a user, and the actions to follow to implement the game mechanic. The following describes an implementation using a 'switcher' mechanic where groups of 3 or more matching objects (referred to in this document as blockers or game elements) are created when a user switches two adjacent objects and the resulting matching adjacent objects are automatically removed.

Thus, the game logic controls the rules for determining if a valid match has been created for removal of the matched game elements from the gameboard. The game logic 2504 operates according to a set of rules of the level the user is playing. The predefined criteria may be embodied in these per-level rules, or may be generic to multiple levels. The game logic will have access to data for each tile including its tile ID designating its location on the grid 80, and associated tile attributes providing information about the contents of that tile, e.g. the game object within that tile, at least one characteristic associated with the game object within the tile. The game logic 2504 will thus be able to determine the game elements to be removed from those respective tiles for each user selection.

The physics engine component 2508 is configured to control the movement of rendering moving game objects in the display. The physics engine 2508 may be part of the game logic 2504.

The above computer device is configured to provide a novel blocker spreading mode. According to the known blocker spreading mode, blocking elements may multiply or spread until they cover a significant portion of, or all of, the gameboard. This renders the gameboard unplayable for a player, with the result that a player is not able to complete that particular level and may become frustrated. According to the new blocker spreading mode described herein, the computer device is modified to provide a tiled data structure which indicates one or more pre-defined sets of tiles to be rendered on the gameboard and, forming one or more respective "chocolate tray". A "chocolate tray" is indicated in the data structure as a predefined set of tiles which are available to support spreading blocking elements. Tiles of the gameboard which are indicated in the data structure as being outside the trays cannot receive a spreading blocking element. When an initial gameboard is rendered on the display, all the tiles within each tray, or only a subset of the tiles within each tray, may comprise spreading blocking elements. If the conditions for spreading of the spreading blocking elements in a subsequent move is satisfied (explained in more detail later), the spreading blocking elements will spread to other tiles within the tray, but will spread only to the tiles of the pre-defined set which constitute the tray, and not beyond the boundary of the tray. This means that the spread of spreading blocking elements is contained by the predefined trays on the gameboard. Thus, certain parts of the gameboard remain playable, even when the spreading blocking elements have spread to their maximum extent as defined by the trays. In other respects, the trays function as part of the gameboard which is rendered on the display. For example, tiles within the tray may support user interactive game elements which may be used (e.g. selected by user input) to form matches, and be replaced according to the normal game mechanic. Note that tiles within a tray may support such game elements alone or in combination with a spreading blocking element as described later. Replacement of game elements within the tray may follow the normal replacement physics for a tile in that part of the gameboard.

Blocking elements may be removed from the tray by making a match adjacent a blocking element within the tray, or by the action of a special "booster" game element which has been triggered. Such "booster" game elements may be triggered by being part of a match condition, or in other ways. If a condition is met in which a blocking element is caused to be removed, the spreading blocking elements do not spread for the next game move. However, if a match is made, and a condition for removing a blocking element is not met, the blocker spreading mode is implemented for the next game move, and one or more spreading blocking element spreads to other tiles within the tray.

Figure 4A:
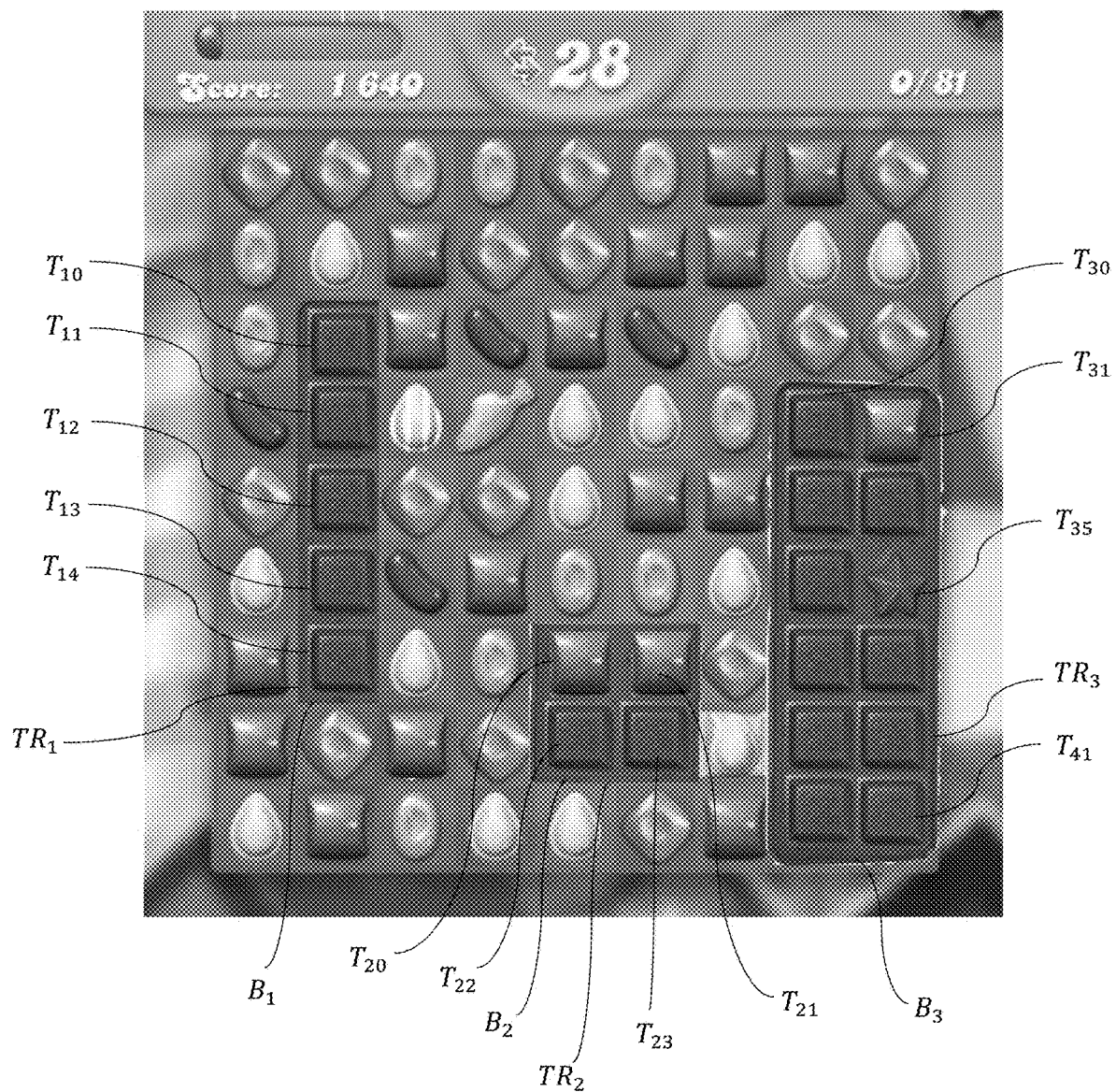
FIG. 4A shows a display of a gameboard with "chocolate trays" in one implementation.

FIG. 4A shows a gameboard comprising three chocolate trays TR1, TR2, TR3. Each chocolate tray is a predefined set of tiles which are available to support spreading blocking elements. Tray TR1 has five tiles T10 . . . T14 arranged in a column. Tray TR2 has four tiles T20 . . . T23 arranged in a 2×2 array. Tray TR3 has twelve tiles T30 . . . T41 arranged in a 6×2 array. In some embodiments, in an initial gameboard, each tray is "full". That is, all tiles within each tray support spreading blocking elements. In FIG. 4A, some game moves have been made since such an initial gameboard. A player has been successful in making matches of least three game elements adjacent the top two tiles T20, T21 in the second tray, such that the spreading blocking elements have been removed from those two tiles and been replaced by normal game elements. Note that the game elements could have been present under the chocolate blockers or have been provided by replenishing vacancies under the chocolate blockers. Similarly, the top right hand spreading blocking element in the right hand tray has successfully been cleared from tile T31 and replaced by a normal game element. Each tray is defined by a boundary B1, B2, B3 which may be visually indicated. In the embodiment of FIG. 9, a further visual indication of the tray is given by the chocolate coloured background of the tiles, which remains even when the tiles support normal game elements.

Note that the third tile T35 down the right hand side of the right hand most tray TR3 has a star motif. This indicates that although this is currently a spreading blocking element, the spreading blocking element covers a special game element such as a booster.

Figure 4B:
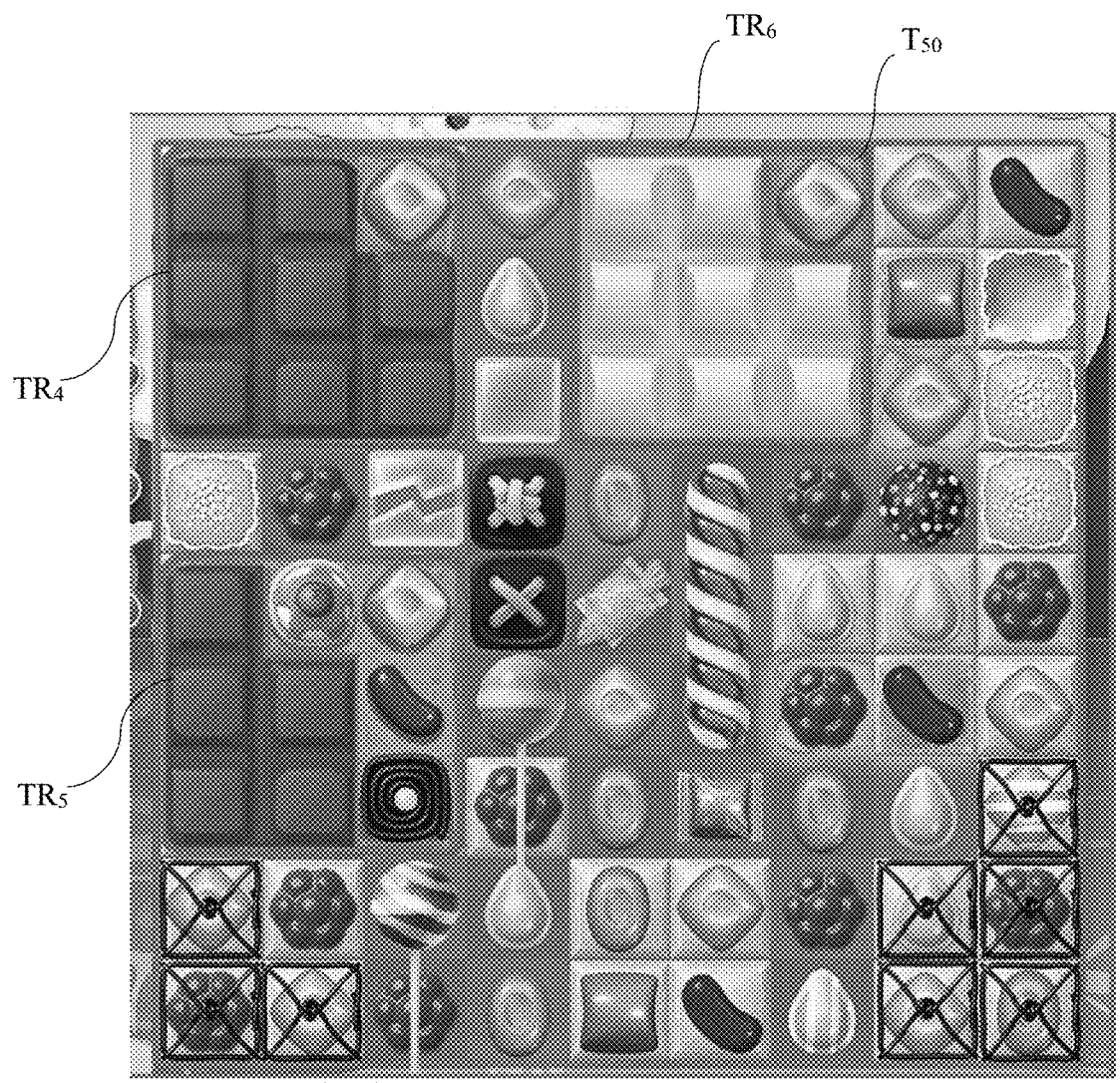
FIG. 4B shows a display of a gameboard with "chocolate trays" in another implementation.

FIG. 4B illustrates an alternative layout of a gameboard showing chocolate trays. TR4 designates a tray in the top left hand corner which is a 3×3 array. The top right hand most tile of the array has been cleared, and includes a user selectable game element. The remaining parts of the tray remain covered in a chocolate blocker.

TR5 designates another 3×3 array constituting a chocolate tray. In this tray, four of the tiles have been cleared of chocolate. Reference numeral TR6 denotes a chocolate tray which has a different kind of chocolate blocker. The chocolate blocker in tray TR6 is "white chocolate". The mechanics of white chocolate are known per se in the existing Candy Crush Saga game. In embodiments of the present invention, these mechanics are, however, constrained by the trays in the same way as for the chocolate blockers. According to the white chocolate mechanic, each tile has two layers of chocolate. If a layer of white chocolate is not removed by a game move (by making an adjacent match, or triggering special boosters etc.), it spreads by one tile (like the chocolate blocker), but also may spread as an additional layer over an existing tile which carries a layer of white chocolate. That is, each tile may carry two layers of white chocolate, such that two user moves are required to fully clear chocolate from a tile of the tray, wherein each user move causes chocolate to be cleared.

While the trays in FIGS. 4A and 4B have been shown as a single column or an array, it will be appreciated that other shapes may be utilised in some embodiments, for example L, H and E shapes.

Figure 4C:
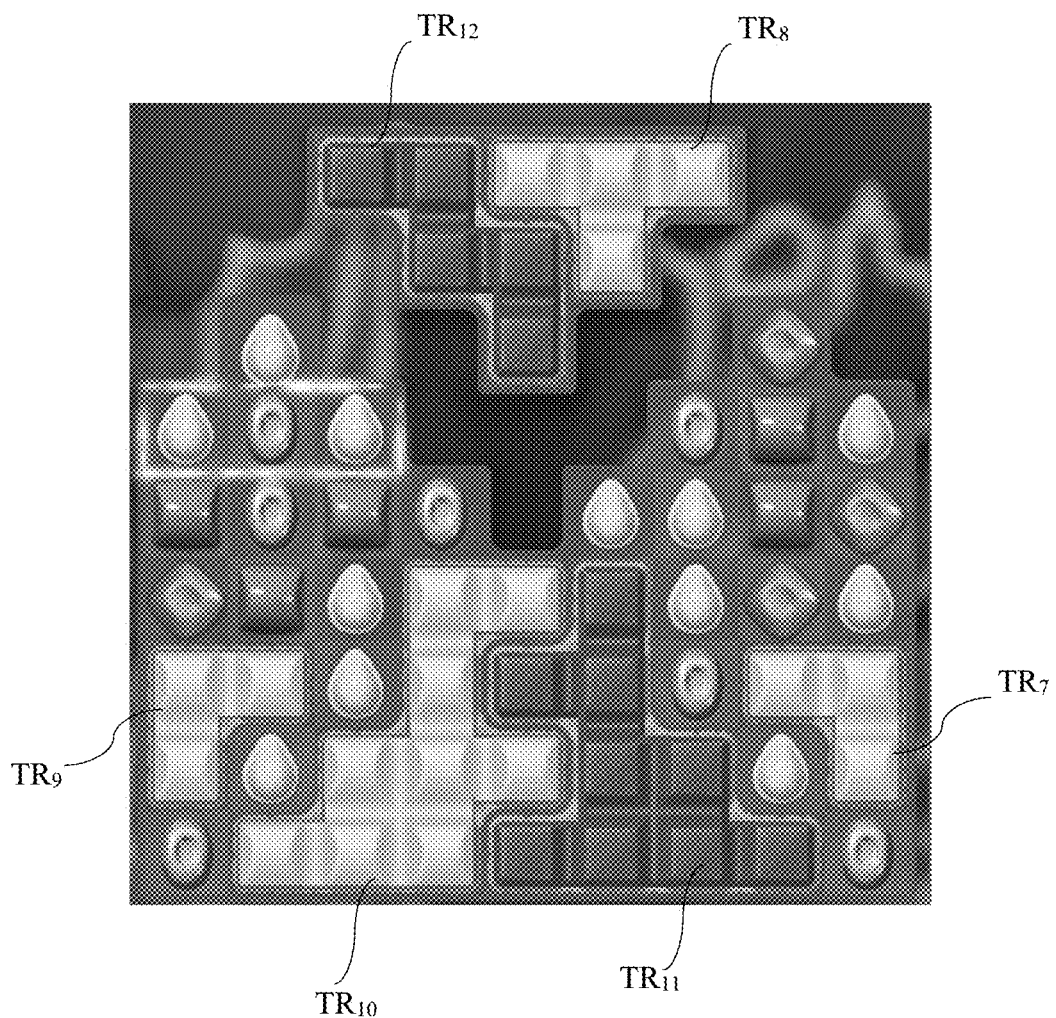
FIG. 4C shows a display of a gameboard with "chocolate trays" in a third implementation.

FIG. 4C illustrate an alternative layout of a gameboard in which chocolate trays have shapes other than those shown in FIGS. 4A and 4B. Six chocolate trays TR7 to TR12 are shown on the gameboard of FIG. 4C. Four trays TR7 to TR10 are trays associated with white chocolate blocking elements and two trays TR11 and TR12 are associated with brown chocolate blocking elements, referred to previously as chocolate blockers.

When all blocking elements on the set of tiles within a tray have been cleared (by making matches adjacent to them or triggering "booster" game elements), then the tray is removed. That is, the set of tiles which were in the predefined set constituting the tray, will no longer be populated with blocking elements in a next move. Note that this is a direct consequence of the requirement that an origin tile for spreading chocolate must itself have a chocolate blocker on it. Thereafter tiles of the tray will be replenished with game objects in the normal course of replacement.

When a blocking element is generated in a blocker spreading mode for a tile which previously had a user activatable game element on it, the user activatable game element may remain on the tile although it is not available to a player, because is blocked by the superimposed blocking element. If the blocking element is subsequently removed, the user interactive game element, which was covered by it, is available on that tile for normal play. Such user activatable game elements may be normal game elements, or special game elements such as boosters etc. In the case where a special game element has been covered by a blocking element, there may be a visual indication on the blocking element which distinguishes it from other blocking elements which do not cover a special game element (as illustrated by the star in FIG. 4, tile T35).

The removal of a tray when all the spreading blocking elements have been cleared from it, may be accompanied by a visual indication of blasting all of the game elements which were present on the tray at that time. This can include activating all special elements, such as boosters. In modes where a score is associated with plays within a game move (such as making a match etc.), a score may be given for clearing the tray. The score may be based on the size of the tray, for example a certain number of points for each tile within the tray.

In some embodiments, the tray is not rendered visually distinct on the gameboard, however, in other embodiments, there is a visual indication of the tray. This may be done by highlighting tiles which form part of the tray, or providing a visual indication of the tray boundary. When all the spreading blocking elements have been removed from the respective set of tiles constituting the tray, the visual indicator may be removed also and/or an animation may be associated with removal of the tray. In some embodiments, on completion of a tray following the removal of all spreading blocking elements in a tray, any special game elements associated with the respective tiles at the set may be activated.

Figure 5A:
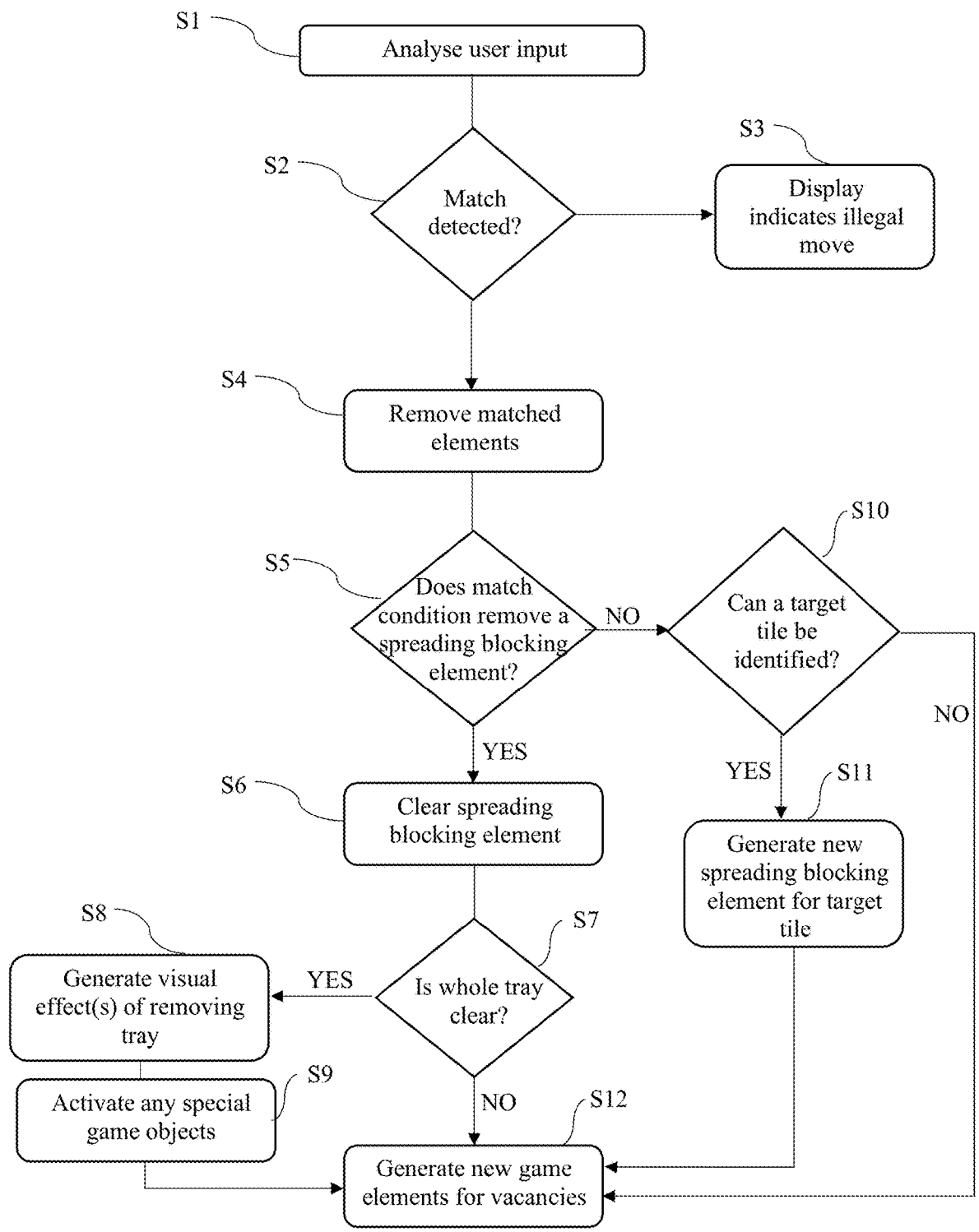
FIG. 5A is a flow chart illustrating a blocker removal and creation process.

FIG. 5 is a flow chart illustrating a process implemented by software in a processor for managing the spreading blockers as discussed. At step S1 the input made by a player at the user interface is analysed. At step S2 game rules are applied to see whether or not at least a three-element match has been created. Whether the colour and/or shape characteristics of adjacent game elements match is determined by a match check. This check may be carried out for the whole gameboard 2 where there are game elements. All game elements on the game board may be match checked against the game elements immediately adjacent to them, for example when controlling a cascade effect between player moves. For each player move, only the game element(s) which experienced the user input and/or the game elements immediately adjacent to that game element are match checked against the game elements immediately adjacent to them. When multiple game elements are detected as having matching characteristics, a matching chain of game elements is formed such that even game elements which are not directly adjacent to each other are included in the same chain as long as they are connected in an adjacent manner via other game elements which also possess the same matching characteristic. In some embodiments, these chains of matching adjacent game elements may have to all be connected in one direction, i.e. they may have to be either vertically or horizontally connected. The match check is implemented after the player selects the two game elements to switch tile locations. If at least a 3-element match has not been detected in step 2, at step S3, the screen indicates an illegal move to a user, and the player must try again. If a match has been detected, at step S4 the matched game elements are removed from the display and an appropriate visual effect is generated for the display to denote the match and the disappearance of the game elements which have been matched. At step S5 it is determined whether or not the match condition removes a spreading blocking element. If the match condition is determined to remove a spreading blocking element, that spreading blocking element is cleared (S6) and then a check is performed at step S7 to determine whether or not all spreading blocking elements in that tray have been cleared. If they have not, new game elements are generated to replenish the gameboard (including any vacant tiles in trays that are not carrying spreading blocking elements or non-spreading blocking elements) at step S12. In some embodiments, a cleared tray may be removed. In such embodiments if at step S7 it is determined that a whole tray has now been cleared, that tray is removed. At step S8 in some embodiments there is a visual effect which is generated of removing the tray, for example, an explosion or an animation of a tray being lifted up and out of the gameboard. Any special game objects in the tray may be activated at this time, for example boosters, at step S9. The process then proceeds to step S12 to generate new game elements for any vacancies to replenish the gameboard.

If at step S5 it was determined that the user move did not create a condition which caused a blocking element to be removed, a blocker spreading mode is triggered. If a target tile can be identified to spread a blocking element (S10), then a new blocking element is generated for that target tile at step S11. Otherwise the process proceeds to generate new game elements for vacancies to replenish the gameboard. If at step S1l one or more new spreading blocking element was generated, after that step the process moves to step S12 to generate new game elements for any vacancies. The identification of target tiles for spreading blocking elements is described in more detail in FIG. 5B.

When new game elements are generated at step S12, these game elements may be provided on the display according to different defined physics (downwards, upwards, sideway etc.).

Figure 5B:
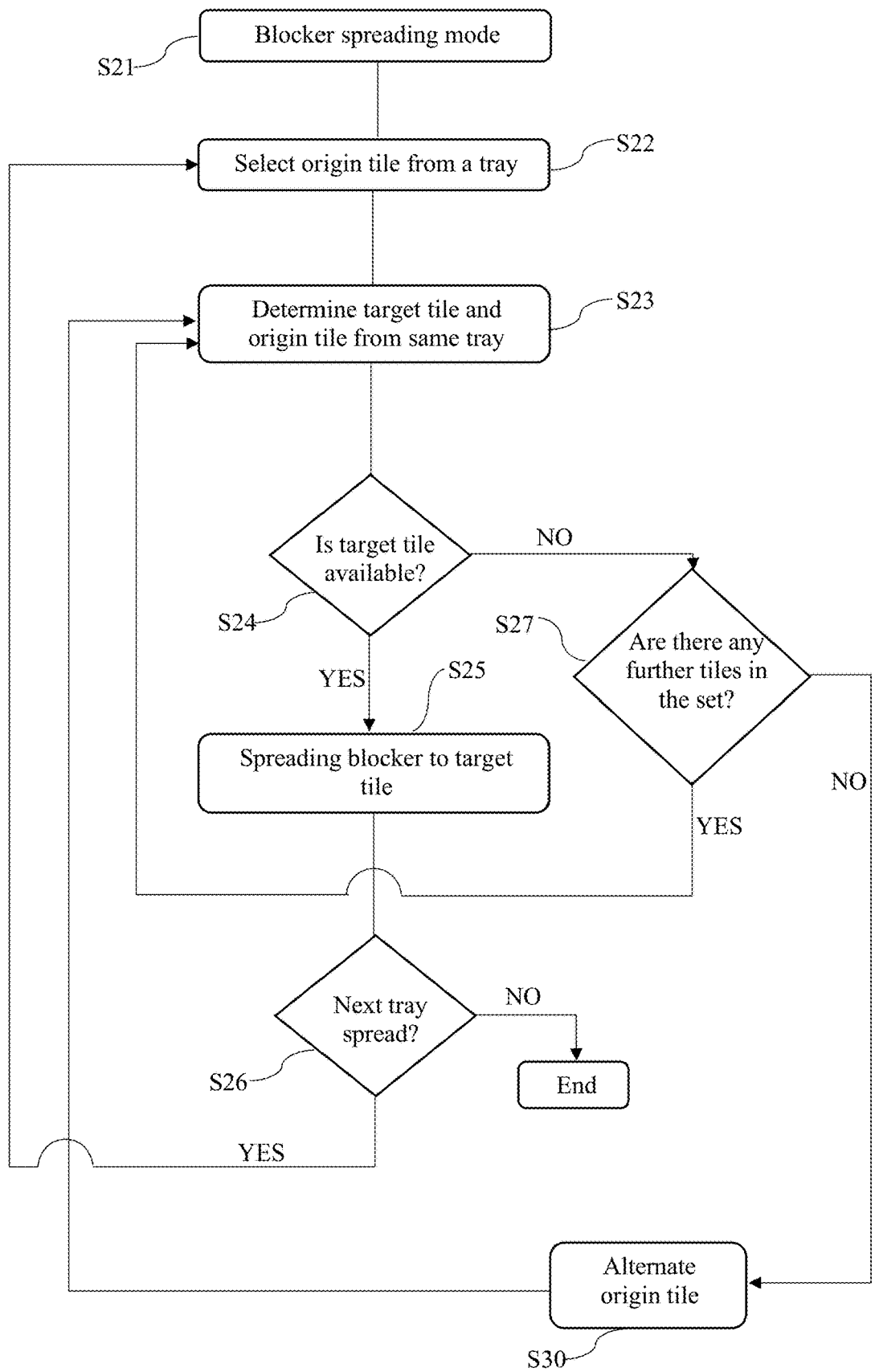
FIG. 5B is a flow chart illustrating identification of target tiles for spreading blockers.

FIG. 5B illustrates a process flow for the blocker spreading mode. At step S21 the blocker spreading mode is triggered (for example by detecting that a match has been made which is not adjacent a spreading blocking element). At step S22 an origin tile is selected from one of the trays.

At step S23 it is determined whether a target tile and an origin tile are from the same tray. This may be done by selecting a target tile for spreading the blocker, and then determining whether or not a set indicator associated with that target tile matches the set indicator of the origin tile. Set indicators are described later. Alternatively, once the origin tile has been selected, the set indicator of that origin tile may be matched against other set indicators and a target tile associated with one of the matching set indicators is chosen as the target tile in the same tray as the origin tile. A target tile may be adjacent the origin tile in some embodiments. At step S24 it is determine whether or not the target tile is available for a spreading blocking element. If it is, a spreading blocker is spread to the target tile in step S25 prior to the next game move. In some embodiments the above steps may be iterated across one or more tray. In other embodiments, there may be a step (S26) to determine if the blocker spreading mode is single tray or multiple tray. That is, in a single tray blocker spreading mode, only one target tile is selected in one of the trays for the spreading of a blocking element. In a multiple tray spreading mode, more than one target tile may be selected from respective trays. If at step S26 it is determined that there is no further trays to be spread, the process ends. If at step S26 it is determined that there is a next tray to spread, a next origin tile is selected from a next tray at step S22, and the process runs through again.

In some instances, the target tile is not available. This may be because the target tile is already populated by a spreading blocking element or any other type of blocking element. In some embodiments, there may be other restrictions on the spreading of the spreading blocking element between game moves. For example, in certain embodiments the blocking elements may not spread to tiles carrying certain types of game objects. In other embodiments, spreading blocking elements may spread over tiles which carry game objects. If the target tile is occupied by an element which prevents spreading, the target tile is determined to be unavailable at step S24.

If it is determined at step S24 that the target tile is unavailable, at step S27, the tray is checked to determine whether or not there are any further target tiles for that origin tile. If there are, one of the further tiles is selected as a possible alternate tile, and the process returns to step S23 to determine the alternate target tile associated with the origin tile is from the same tray.

If, however, there are no further tiles in the set, according to some embodiments an alternate origin tile may be selected from a different tray at step S30. The process proceeds back to step S23 to determine a target tile in the same tray as the alternate origin tile. Note that in other embodiments, the process may stop at step S27 when it is determined that there are no further tiles in the set. That is, the process may decide not to spread chocolate from other trays in that game move.

In some embodiments, the reason for the target tile being unavailable may be determined. This step may be performed as part of the step S24 to determine if the target tile is available. Alternatively, the reason for a tile being unavailable may be found in an additional step after step S24 and before step S27 for determining if there are any further tiles in the set.

In some embodiments, the availability of the further tiles is determined at step S27. That is, at step S27 it is determined if there are any further available tiles into which chocolate can be spread. In such an embodiment, the next target tile selected may be from the determined available tiles, so the method can proceed to step S25 where the chocolate is spread to the available target tile.

Figure 5C:
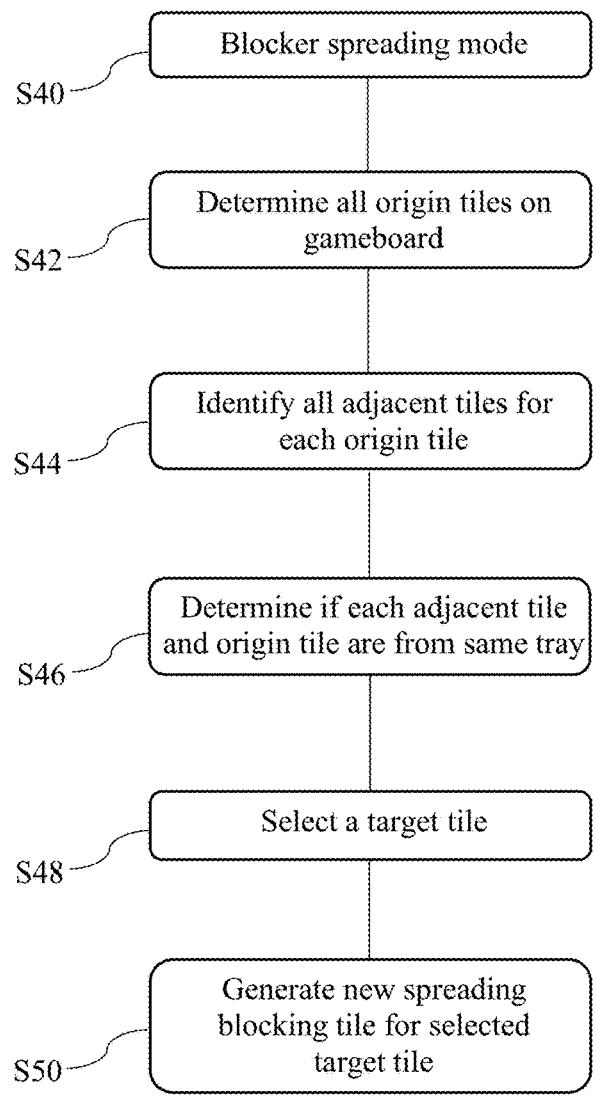
FIG. 5C is a flow chart illustrating an alternative method of identification of target tiles for spreading blockers.

FIG. 5C shows an alternative process flow for the blocker spreading mode. At step S40, the blocker spreading mode is triggered (for example by detecting that a match has been made which is not adjacent a spreading blocking element).

At step S42, all of the origin tiles on the gameboard are identified. The origin tiles may be from one or more different trays of the gameboard and be associated with one or more different types of spreading blocking element.

At step S44, the tiles adjacent to each of the determined origin tiles are identified, and at step S46 it is determined if each adjacent tile is in the same tray as the origin tile to which it is adjacent. If the adjacent tile is not in the same tray as the origin tile, it cannot be a target tile. However, adjacent tiles which are in the same tray as their adjacent origin tile may act as target tiles. A data structure 1603 is accessed and a tray indicator 1609 is checked for each of the adjacent tiles and its associated origin tile to check if the same tray requirement is met. There may be additional criteria for an adjacent tile to be a valid target tile, as discussed later.

Once the adjacent tiles which are in the same trays as their origin tiles have been identified, one of these adjacent tiles is selected to be the target tile at step S48. The target tile may be selected from the adjacent tiles randomly. Alternatively, the target tile may be selected from the adjacent tiles by prioritising certain tiles to be spread to first. For example, a list of the adjacent tiles may be generated with the adjacent tile with the highest priority at the top of the list and the subsequent entries of the list being those adjacent tiles with decreasing priority.

The adjacent tiles may be prioritised based on the type of user activatable element occupying the tile, each user activatable game element or type of game element being associated with a different priority.

For example, normal game elements with no special properties, such as coloured candies, may have the highest priority, with each type of normal game element being associated with a different priority, followed by game elements with special properties, referred to as booster elements, such as jelly fish candies, striped candies, and colour bombs. The different types of booster elements may be associated with different priorities for selection as the target tile.

If two or more tiles of the same priority occupy adjacent tiles, the ordering of those tiles on the list may be random.

Alternatively or additionally, rules may be introduced for ordering user activatable game elements of the same priority. For example, a booster which is generated as a result of specific user game moves, i.e. awarded to the user for performing the required moves, may be positioned lower on the priority list than the same booster, with the same priority, which is presented to the user through a gameplay refill mechanism so that the booster which was awarded is less likely to be covered by the spreading blocker. That is, the tile occupied by the gameplay refill generated booster is preferentially selected to be the target tile over the tile occupied by the awarded booster with the same priority. Another example rule may be that the adjacent tile closest to the tile from which game elements have been removed from the gameboard is preferentially selected as the target tile from a group of two or more tiles occupied by the same priority game elements.

Alternatively, user activatable game elements may be grouped into priority groups but randomly assigned a location in the priority list within their group. For example, normal game elements of different types may all be associated with the same priority and the tiles populated with normal game elements randomly assigned a priority order within the group of tiles populated with normal game elements.

The tile with the highest priority is then determined to be the target tile. It will be appreciated that the full priority list may not be determined, but rather the target tile found by determining if there is a tile populated with the highest possible priority game element, and if not, by the second highest priority game element, as so on until the adjacent tile populated by the highest priority element from those populating the adjacent tiles is found. Similarly, when a target tile is selected at random, a single adjacent tile may be selected without the need to generate a random list of all adjacent tiles.

In another embodiment, user activatable elements are associated with a priority as discussed above, and a list of the adjacent adjacent tiles is generated by placing the adjacent tiles in a random order in the list. The tile associated with the highest priority which appears first on the randomised list is then selected to be the target tile. For example, the list of the adjacent tiles is generated with the tiles in a random order, and the tile populated by a normal candy which appears first on the list is selected as the target tile. If there is no tile populated by user activatable game elements with the highest priority, the list is assessed again for the first tile populated by the second highest priority user activatable game element, and so on until the target tile is selected. It will be appreciated that in the second and subsequent iterations, when the second and subsequent levels of priority elements are sought, a new list may be generated with tiles in a random order from the relevant adjacent tiles such that the order of the tiles in the list may change with each iteration.

Once the target tile has been determined, the spreading blocking element spreads to the target tile at step S50.

There may be additional requirements for an adjacent tile in the same tray as the origin tile to be able to act as a valid target tile. For example, a target tile cannot be populated by a blocking element. In some embodiments, the target tile must be populated by a user activatable game elements, i.e. it cannot be populated by a blocking element or be a "hole" in the gameboard. To check that the additional criteria are met, a tile attribute 1607 stored in the data structure 1603 is checked for each of the adjacent tiles.

The tile attributes 1607 may be checked at or after step S46, such that the adjacent tiles listed at step S48 in order to select the target tile do not include the adjacent tiles which cannot be target tiles. Alternatively, all adjacent tiles which are in the same tray as their origin tile may be listed at step S48 and the tile attributes checked in the selection process. For example, when selecting a target tile at random at step S48, the tile attribute may be checked once a tile has been randomly selected, such that if it does not meet the criteria a different tile is randomly selected to be the target tile. In embodiments in which the tiles are listed based on priority, blocking elements and holes may be given the lowest priority of being selected, such that they are placed at the bottom of the priority list, or they may not be associated with a priority such that their tiles are implicitly excluded from the list of valid targets.

As described above, there may be two or more types of spreading blocking elements, such as the brown and white chocolate shown in FIGS. 4B and 4C. The different types of spreading blocking elements are provided in different trays. That is, when spreading blockers are generated at steps S11 or S25 in the methods described above, the type of spreading blocker which is generated to populate the target tile is the type corresponding to the tray in which the target tile is situated.

In some embodiments, spreading may occur even if a condition to remove a spreading blocking element has been met. This may be the case, if there are two or more different types of spreading blocking elements, as illustrated in FIGS. 4B and 4C. For example, a match condition results in a brown chocolate blocker from tray TR4 in FIG. 4B. There is no subsequent spread of brown chocolate blockers since a brown chocolate blocker has been removed. However, there is also a white chocolate tray TR6 on the gameboard. There is an available tile T50 in tray TR6. This tile is found using the method of FIG. 5B and a white chocolate spreading blocking element is generated at the available tile T50. This can be extended to situations in which both types of chocolate are spread, i.e. no chocolate blockers are removed so both white and brown chocolate spreading blockers are generated for respective target tiles in respective trays. The tray in which the second type of spreading blocking element is to be spread, in this example tray TR6, may be chosen randomly from the trays associated with the second type of spreading blocking element.

The method described above with reference to FIG. 5A may be modified in order to implement spreading in more than one tray of different spreading blocker types.

For example, step S10 is modified to identify a target tile, if possible, for all types of spreading blockers on the gameboard, and step S11 to generate spreading blocking elements for each identified target tile. These modifications allow for spreading of two types of spreading elements for a single user game move.

The method may also be modified such that the type of spreading blocker element which has been removed is identified, for example at step S5 or in a subsequent step. Steps S6 to S9 are performed for said identified blocker type. A step of determining whether or not there is a second type of spreading blocker on the gameboard is introduced after step S5, followed by the steps of determining if a target tile can be identified for the second type of spreading blocker, and, if so, generating a new spreading blocker of the second type for the identified target tile.

Alternatively or additionally, step S48 of FIG. 5C may be modified to select a valid target tile for each type of spreading element. This may be achieved by selecting the highest priority tile for each type of spreading blocking element or randomly selecting a valid target tile from those associated with each type of spreading element for each type of spreading blocking element.

The effect of these modifications is that two different types of spreading blocking element can be spread in the same iteration, i.e. after a single user game move. A similar method may be used to spread spreading blocking elements in each tray of the gameboard in a single iteration, with the methods being modified to select a target tile in each tray rather than for each type of spreading blocking element.

The different types of spreading blocking elements may be spread using the same spreading mode. Alternatively, different spreading modes may be defined for each type of spreading blocking element.

It will be appreciated that, although the second spreading blocking element type used in this example is white chocolate which, as described above, has different properties to brown chocolate, the different types of spreading blockers may have the same game properties, but be grouped to allow for spreading of the second type of spreading blocker even if the first type is not spread. The different types may be rendered visibly distinguishable to the user on the display such that the user can identify the different types and be able to determine how many new spreading blockers will be generated after each user game move.

Figure 6:
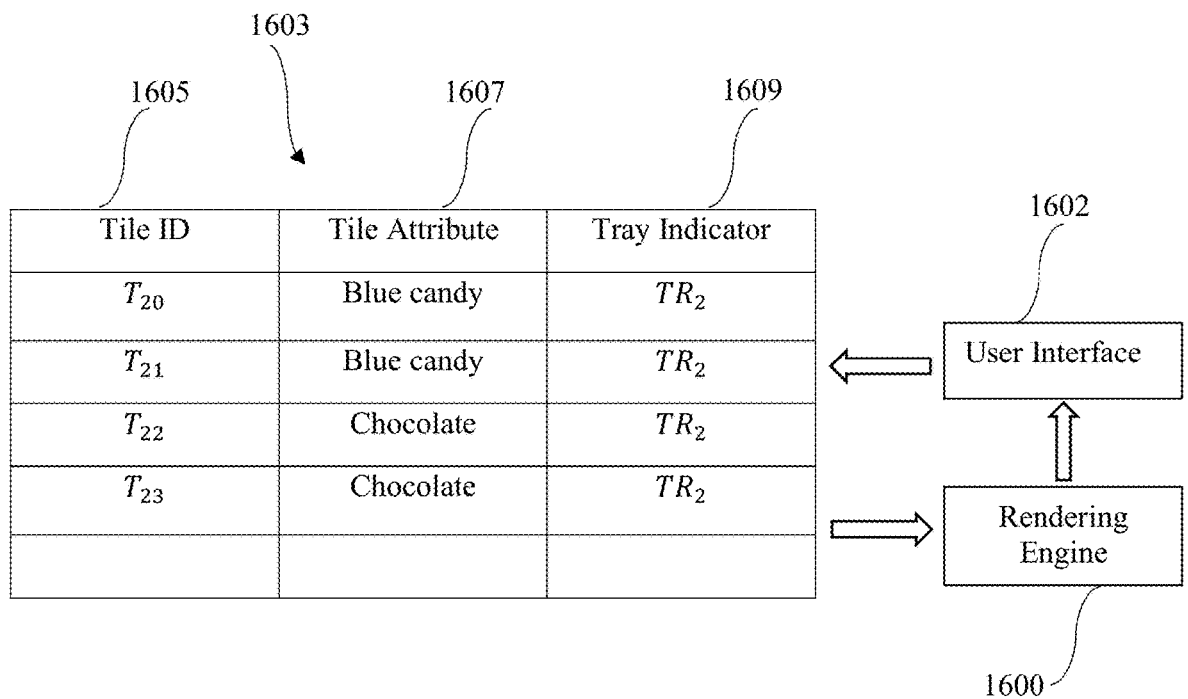
FIG. 6 shows a schematic form of a data structure storing tile data.

FIG. 6 illustrates a data structure for managing the chocolate trays, and schematically illustrates the interrelation between the data structure 1603 and the rendering engine 1600 of the graphics controller 1308 (illustrated in FIG. 3). The data structure 1603 can be held in any suitable storage circuitry, such as illustrated by memory 1306 in FIG. 3. The rendering engine 1600 drives the display on a user interface 1602 which receives the video output from the graphics controller 1308.

The data structure 1603 is responsible for determining what replacement game objects or blocking elements are delivered to the user interface. Each tile has a tile ID 1605. The tile ID 1605 can define the location on the user interface where the tile is to be replenished with a game object/blocking element following a game move in gameplay by a user, This allows the rendering engine 1600 to generate a new game object/blocking element for that tile at an appropriate location on the user interface 1602. Each tile has tile data comprising a tile ID 1605 and tile attributes 1607 which defines how the tile is to be displayed, that is what game element it has associated with it, and whether it has any blockers in addition to or instead of a game element, or any foreground or background. The data structure also has a respective field for holding for a tile a set indicator 1609 to identify the tray in which that tile belongs. Not all tiles have set indicators—only those which form part of the 'trays' in which spreading blockers may spread. In FIG. 6, the data for the tray S2 is shown by way of example. If tile T22 was selected as the origin tile, tile T20 could be a target tile. It would be ascertained to be in the same set based on the set indicator and available to spread chocolate. Note that an origin tile must have a spreading blocking element. Although not shown in FIG. 6, note that tile data could define a game element (e.g. blue candy) and a spreading blocking element (e.g chocolate) on the same tile.

The data structure 1603 may also comprise a field for holding a spreading blocker type associated with the tray. Each tile ID 1605 associated with the same tray indicator 1609 is associated with the same spreading blocker type, such that all spreading blocking elements populating a single tray are of the same type. The spreading blocker type may be checked when a spreading blocker is removed for embodiments in which spreading of a different type of spreading blocking element occurs even when a spreading blocking element is removed as discussed above.

Figure 7:
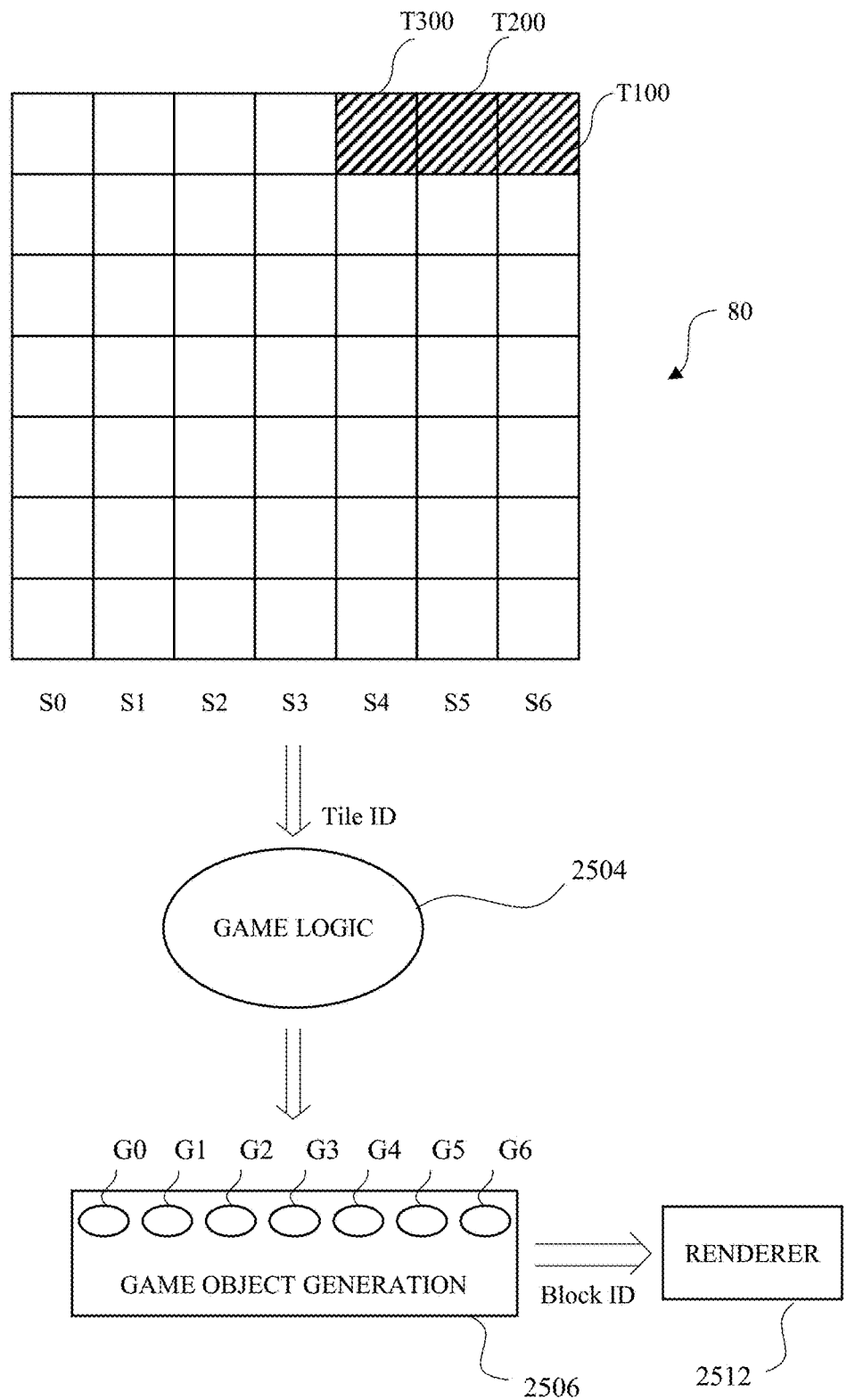
FIG. 7 is a schematic diagram illustrating game element refill.

FIG. 7 is a highly schematic block diagram illustrating how gameboards are rendered visible to the user through a refill process. In the described embodiment, the refill process is set to random. In fact, the random refill process may be pseudorandom. Each game level has an initial gameboard which is a layout of tiles, each tile having one or more tile attribute defined by the tile data in the initial layout. FIG. 7 shows a tile layout in the form of the grid 80. The grid can be considered as a map which may be used to determining the relative positions of tiles on the game board from the tile ID. This tile grid 80 shows an array of tiles arranged in rows and columns. In FIG. 7, the grid 80 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns.

In order to render a gameboard on a display, each tile is associated with a game object to be rendered at that tile location. The nature of the game object, that is, for example, if it is a blocker or is playable (a normal game element), is determined by the tile attribute(s). The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where game objects may need to be spawned to replenish the gameboard. In a normal game refill process, new game objects are spawned in tiles that have an attribute associating them with playable (user interactable) game elements. A new game element is spawned into effect at an entry point of the set. For convenience, the endmost tile (in this case T100) can be considered the entry point for S6. However, any entry point for a set can be defined, and the precise entry point may depend on the orientation or shape of the set. Game objects are spawned into sets at their respective entry points. If the tile below the entry point is vacant, the spawned game object is moved down to that tile and then a further game object is spawned above it at the entry point. Note that sets may be of different configurations and spawned game objects may be moved to vacant tiles according to different refill physics.

Each tile of the grid 80 may be associated with data to indicate a status, such as filled or unfilled (empty/vacant) in relation to game elements. Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular game objects. This may be as the endpoint of a game element which is already in the game board and moving as a result of a game move due to the action of a physics engine 2508, or as the endpoint of a new game object entering the game board.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a game object is to be spawned. That is, the tile identifier indicates the set in which the tile belongs, and enables the entry point of the set to be indicated. This tile identifier enables the appropriate algorithm to be activated, and a game object identifier is generated by that algorithm to a renderer 2512 which controls a display 1318 on which the game board is presented to cause that game object to be inserted at the entry point. Within each set the process may be entirely deterministic. That is, game objects are provided in a predetermined sequence into the set, and moved through the set in a predetermined way. That sequence may be the same for all sets, or each set may have a different sequence. Alternatively, the game objects may be spawned in a random sequence. Randomly spawned game objects will still move through the set in a predetermined way, as dictated by the refill physics.

Each generator G0 to G6 can be controlled with a respective seed which then causes a pseudo-random sequence of game objects to be generated based on that seed.

The gameboard 2 used in gameplay is defined by the tile grid 80. Each tile is rendered at a location and may support a game object. Some tile locations may constitute a 'hole' in the game board at which no gameboard tile is located. As described earlier, each tile has its own unique ID associated with it. Attributes about the game objects occupying each tile of the grid are stored in association with the name, or ID, of the tile. This tile data may be stored in, for example, the tile database 1603 (see FIG. 6). When game elements are removed from the tile grid 80, tile refill occurs and the game objects located at the tiles affected by the refill process change. The data stored in the tile database is updated to represent the locations of elements on the grid 80 after refill. The position of a game element may be either where the game element is on the grid 18 or where the game element is going (e.g. the endpoint of a game element moving due to a refill).

Holes in the grid show a background and are not valid game board areas. That is, there are no tiles at the locations of the holes. Alternatively, there may be tiles at the locations of the holes in the grid 80, but the attribute of these tiles may be holes, and their attribute remains unchanged through game play. Blocks cannot occupy holes in the gameboard, but can fall through them. The shape of the grid may vary.

The computer device configured to implement the blocker spreading mode is configured to implement it in a game with a switcher mechanic. The ideas explained may also be implemented for games with other mechanics. Features of one example of a switcher mechanic is laid out below.

Match 3 Switcher Game

The above described computer device is configured to interact with a user to implement the blocker spreading mode, which in some embodiments can be a match—3 switcher game. The following description describes additional game components of match 3 switcher games. The person skilled in the art will understand that there are many other ways the present ideas can be implemented and the description is not limited to only one implementation. The following features can be used in combination with any of the aforesaid novel device features or game components.

Glossary/Terms

Game board: The area where the matching and swapping of elements occur: Note that the entire game board is not visible to a player but can be scrolled to change the player view.

Game elements: All elements that appear on the game board.

Standard game elements: These are the six basic candies used for making switches and colour matches on the game board. Compared to special game elements, the standard game elements have no extra properties or behaviour, they are only used to make colour combinations or to create new special game elements.

Ingredients: Game elements that are included in levels where one of the goals to complete the level is to bring down ingredient elements to the bottom of the game board.

Jelly block: A game element that is placed underneath other game elements and need one or two matches on top of them to disappear.

Special game elements: All elements that appear on the game board and which have specific behaviours and properties.

Striped candy: A special candy with a line blast effect which means it removes one row or one column.

Line blast: An effect which removes one row or one column.

Moves & Score Level: In this game mode you have a limited number of switches before running out of moves. If you have not reached the score required to earn at least 1 Star, then you will fail the level.

Jelly Level: In this game mode the game board behind the candy is covered in jelly. Remove the jelly by matching candy on top of the jelly. If you fail to remove all jelly before running out of moves then you will fail the level.

Ingredients Level: In this game mode, ingredients will appear on the game board. Collect these ingredients by bringing them to their delivery point. On the side of the board you will see a recipe of how many ingredients you need to collect. If you do not bring down all the ingredients before running out of moves then you will fail the level.

Time Limited Level: In this game mode there is a time limit. If you have not reached the score required to earn at least 1 Star when the time runs out, then you will fail the level.

Candy Order level: In this game mode, you are tasked with collecting a number of candies. This is done by removing the wanted candies. If you have not collected all the wanted candies before running out of moves then you will fail the level.

Bomb element: a candy in wrapped paper which removes candies in a 3×3 square area.

Wrapped candy: a candy in wrapped paper which removes candies in a 3×3 square area.

Colour Bomb: Removes all candies of the colour it is being swapped with.

Booster: Something that enhances the gameplay and that supports, assists, or increases power or effectiveness.

Blocker: Blocking game elements that are unswappable, need 1 or more matches next to them to disappear or may be removed by triggered special game elements and are in the way for falling candies.

Candy Crush Saga™ by the games developer King™ is a game belonging to the match-3 category of games. This means that the core basic of the game is to match three or more game elements sharing the same colour with each other. In Candy Crush Saga, these game elements are implemented as candies. FIG. 1 and FIG. 8 shows one implementation of the first level in Candy Crush Saga™ where candies have to be matched to complete the level.

The game has more than 350 different levels and not all of those levels have the same requirements to be completed. Simply matching three or more game elements is not enough to complete all levels in the game but the player has to meet certain goals as well. These goals could be to reach a certain amount of points before running out of moves or time; to bring down certain game elements to the bottom of the screen; to remove a certain amount of game elements before running out of moves or to collect certain game elements through specific matches before running out of moves.

If the game becomes difficult there are boosters to help the player pass a level. These can be obtained from in-game purchases or received as gifts from friends connected through a social network.

The game also has a candy land themed map view. The map view shows what levels have been completed as well as how many levels are left to play. Throughout the game and for each level completed, the player journeys across the map and follows the story of a girl who is journeying through the candy land. The map is also divided into different areas where each area has its own candy theme as well as a small story connected to that area.

Rules
Basic Moves and Combinations
Moves

To play game elements in the shape of candies are swapped with each other to make moves on a game board. To gain points the player has to make moves that create matches of at least three of the same candy. In doing so, the player gains points and the matched candies are removed. As a result, new candies populate the game board in order to fill any empty spaces created. The game board is populated depending on the physics of a tile associated with each game element. For all candies that are removed on the game board, points are always shown in the same colour as the candy that was removed, for example three red candies will show red points, green candies green points and so on. If a blocker element would be removed then the points shown would be in the same colour as the candies from the match that removed it.

Only swapping moves that will create at least one combination of at least three game elements of the same type are allowed.

Limited Number of Moves

A typical game mode of Candy Crush Saga provides the player with a limited number of moves to reach the level target.

In some implementations additional moves can be earned by good gameplay.

The game board may be a scrolling game board. The display displays a grid of square tiles, each with a game element, showing the whole or a portion of the level being played.

Different Goals to Complete Levels

To add more diversity and make Candy Crush Saga™ a more dynamic game, players have to fulfil different criteria in order to complete different levels; these are referred to as goals. Each level always has one or more goals that have to be fulfilled in order to complete that level.

Reach a Set Score Before Running Out of Moves

One of Candy Crush Saga's most common goals is to collect a certain amount of points before running out of moves. The points are collected through making matching combinations on the game board. The smarter combinations made, the more points.

Reach a Set Score Before Running Out of Time

Candy Crush Saga also has timed levels. The goal that needs to be fulfilled on these levels is to collect a certain amount of points before time runs out. The smarter combinations made, the more points.

Bring Down Ingredients

Some levels are referred to as Ingredients levels. The Ingredients levels have two goals which need to be fulfilled in order to complete the level:

The player has to reach a certain target score before running out of moves.

The player has to bring down a certain number of so-called ingredients to the bottom of the game board before running out of moves. When the ingredients reach the bottom of the game board they disappear and candies above them take their place. Ingredients are game elements shaped as fruits or nuts and only exist for this specific goal. They are not matchable with other game elements but they can be switched with other game elements.

Clear Jelly

One of the most frequent set of goals in Candy Crush Saga is the one used for levels that contain Jelly blocks. Jelly blocks are game elements that are found underneath other game elements and need one or two matches on top of them to disappear (See description elsewhere). The goals that need to be fulfilled on levels with Jelly blocks are:

Reach target score before running out of moves (as described elsewhere)

Remove all jelly blocks before running out of moves

Collect Certain Elements

Another type of level Candy Crush Saga has introduced to their variety of game modes is a so-called Order level. Order levels have two goals:

Reach target score before running out of moves (as described elsewhere).

Collect certain amount of candies through specific matches as well as achieving hard to make combos specified on the level played.

Balance Mode

In this game mode, players are required to collect an even amount of two colours of candies to complete the level. The level goal can be indicated with a scale where the two different types of candies to be collected are placed on either side. When the count is unbalanced, one side of a scale starts tipping, the bigger the difference the faster it tips. If one end touches bottom level has failed. Score is given to the player based on the number of moves it takes to collect the required amount of the two colours.

Crescendo Mode

The goal of this game mode is to light up all squares/cells on the game board. In some implementations, the requirement to light up a cell is to combine a candy that is in that cell. In other implementations, the player has to combine multiple candies in the same cell before it lights up.

Digging Mode

In this game mode, players are required to combine candies in cells adjacent to blockers in order to 'dig' down in the level. When digging, the player can uncover objects that are covered initially.

Multiple Game Modes

All of the game modes described herein can also be used in any combination with one another. For instance, the requirement to complete one level could be to remove all jelly as well as bringing down ingredients.

Basic Rules

How to Play

If the player tries to make a move with two candies in such a way that no candy will be matched with at least two more of its own colour, then the move will not be allowed and the player will have to try to find another move.

If no moves are possible on the game board then all the candies are reshuffled so that there will always be at least one possible move available. If the player can't see or find a move to make, then the game helps the player by giving a hint. The hint is displayed after a few seconds of inactivity and is shown by brightening and magnifying the candies of a possible move in a flashing animation.

Advanced Rule

Not only the match of 3 candies is allowed but matches of more candies can also be done; Matches with more than 3 candies give more points and is something the player should try and aim for. Different acceptable matches are:
  Match of 3 in a line.
  Match of four in a vertical line.
  Match of four in a horizontal line.
  Match of four in a 2×2 square.
  Match of five in a vertical line.
  Match of five in a horizontal line.
  Match of five in a T-shape.
  Match of five in an L-shape.
  Match of 6 or more candies in a combination of 4-in-a-row, 5-in-a-row, T- and L-shapes.

As can be noticed from the list of possible matches, no diagonal matches are accepted. Diagonal matches and/or swaps can be allowed in some implementations of the game.

Combos to Receive Special Elements

Matches made of four or more candies not only give more points but also reward the player with special game elements. The special game elements received from combos have various positive properties and can be used to gain more points and to easier pass a level. The elements received from different matches are:
  4-in-a-row: Striped candy—striped candies remove a whole row or column (including any blockers) if matched with two or more candies of the same type
  4 in a 2×2 block: Fish—Fish are triggered in a match condition. When triggered, they "swim" to a random candy and remove it.
  L- or T-shape: Wrapped candy—when triggered in a match, wrapped candies trigger two extensions in a cascade, removing candies in a 3×3 square around the wrapped candy.
  5-in-a-row: Colour bomb—colour bombs are triggered if swapped with any candy—no match -3 is necessary. When a colour bomb is triggered it removes all candies of the same colour as the candy that was used to trigger it.

If a match is made with more than 6 candies, then it is likely that the combo is a shape merged from 4-in-a-row, 5-in-a-row, L-shape and T-shape. If so, there is a hierarchy of what kind of special element is received:
  If there is a merge of 4-in-a-row and an L- or T-shape, then the special game element received will be the same as from an L- or T-shape. L- and T-shapes give the same special game element.
  If there is a merge of 5-in-a-row and an L- or T-shape, then the special game element received will be the same as from a 5-in-a-row combo.

How to Trigger Special Elements

To use the special game elements received from combos there are two different ways:
  Some of the special game elements are triggered through a standard match with two or more candies of the same colour as the special game element.
  Some of the special game elements are triggered by swapping place with any candy regardless if a match-3 is made.

Combining Special Elements with Each Other

Special game elements received from matches can be combined with each other for various positive effects affecting the game board. Striped candies, Wrapped candies and Colour bombs can all be matched with each other. To trigger these combos they do not need to be matched by game elements of the same colour but can simply be swapped with each other for an instant trigger.

Points

The points given for different combinations and removals of blocks are:
  3-in-a-row: 60 points
  4-in-a-row: 120 points
  5-in-a-row: 200 points
  T-shape: 200 points
  L-shape: 200 points
  Break a Jelly block: 1000 points
  Break a Frosting block: 20 points/per block
  Break a Chocolate block: 20 points/per block
  Get an ingredient to the bottom of the screen: 10 000 points
  Using a special game element to remove other game elements: 60 points/per element removed Game Elements Standard Game Elements In Candy Crush Saga there are 6 standard game elements (see FIG. 15) which all look like candies:
  Purple candy in the shape of a flower
  Blue candy in the shape of a sphere
  Green candy in the shape of a square block
  Red candy in the shape of a tilted bean
  Yellow candy in the shape of a drop
  Orange candy in the shape of an oval Special Game Elements Special game elements can either be received from special combos or from an automatic placement on the game board.

It will be appreciated that, whilst specific embodiments of the invention have been described, these are not exhaustive.

The scope of the invention is not defined by the described embodiment but only by the appendant claims.

The invention claimed is:

1. A computer device having:
a user interface configured to provide a gameboard comprising a plurality of tiles, each supporting a respective game object, the game objects comprising user activatable game elements of differing characteristics, and blocking elements wherein a blocking element is a displayed game object that is unresponsive to user engagement,
the user interface displaying one or more blocking element regions in the gameboard, the one or more blocking element regions respectively including one or more predefined sets of tiles of the plurality of tiles wherein the one or more blocking element regions indicate that the tiles of the blocking element regions are each configured to selectively include a spreadable blocking element and further indicate that other ones of the plurality of tiles outside of the blocking element regions each are prevented from including a spreadable blocking element;
the user interface configured to detect user input when a user engages with a user activatable game element in a game move;
a processor configured to:
receive a detected user input with one of the user activatable game elements,
in response to receiving the detected user input, detect a match condition of a plurality of the user activatable game elements having matching characteristics, wherein the matching characteristics include at least one of the shapes of the plurality of the user activatable game elements and the colors of the plurality of the user activatable game elements,
in response to the detecting the match condition, remove the plurality of the game elements of the match game condition and
in response to the removing the plurality of the game elements, generate and display new game objects to replenish the gameboard for a next game move; and
computer storage that stores a data structure having tile data for each tile of the plurality of tiles, wherein the tile data for each tile of the one or more predefined sets comprises a set indicator which indicates whether the tile is in one of the predefined sets,
wherein the processor is configured to:
detect that a blocker spreading mode has been triggered in the game move,
select an origin tile of the plurality of tiles which supports one of the spreadable blocking elements,
identify a target tile of the plurality of tiles to which the spreadable blocking element may spread by querying the data structure to determine from the set indicators for the origin and target tiles that they are in the same predefined set of the one or more predefined sets of tiles,
when it is determined from the set indicators for the origin and target tiles that the origin and target tiles are in the same predefined set of the one or more predefined sets of tiles, generate a new blocking element for the target tile for the next game move, and display the new blocking element on the target tile.

2. The computer device of claim 1 wherein the processor is configured to identify the target tile as one of the plurality of tiles that is adjacent to the origin tile.

3. The computer device of claim 1 wherein the processor is configured, if it is determined that the origin and target tiles are not in the same predefined set of tiles, to identify an alternate target tile and to determine from the set indicators for the origin and alternate target tiles that they are in the same predefined set of tiles and, if so, to generate a blocking element for the alternate target tile.

4. The computer device according to claim 1, wherein the processor is configured, if it is determined that the origin and target tile are not in the same predefined set of tiles, to select an alternate origin tile and to identify a corresponding alternate target tile and to determine from the set indicators for the alternate origin and alternate target tiles whether they are in the same predefined set of tiles, and if so, to generate a blocking element for the alternate target tile.

5. The computer device according to claim 4 wherein the processor is configured to select the alternate origin tile from the same predefined set as the origin tile.

6. The computer device according to claim 4 wherein the processor is configured to select the alternate origin tile from a different predefined set of tiles than the origin tile.

7. The computer device according to claim 1 wherein the processor is configured to select a plurality of origin tiles, each origin tile of the plurality of origin tiles being from a respective predefined set of tiles and to generate blocking elements for corresponding respective target tiles for the next game move if it is determined that each respective origin tile and corresponding target tile are in the same respective predefined set of tiles.

8. The computer device according to claim 1 wherein the processor is configured to identify a set full condition in which all tiles in a predefined set support a blocking element, and in said set full condition to select an alternate origin tile from a different predefined set of tiles.

9. The computer device according to claim 1 wherein one or more tiles of the predefined sets of tiles which are available to support spreadable blocking elements support user activatable game elements.

10. The computer device according to claim 1 wherein one or more tiles of the predefined sets of tiles which are available to support spreadable blocking elements are vacant.

11. The computer device according to claim 1 wherein one or more tiles of the predefined sets of tiles support a respective non-spreadable blocking element which renders the one or more tiles unavailable to support a spreadable blocking element.

12. The computer device according to claim 1 wherein the predefined set of tiles or each of the one or more predefined sets of tiles is visually indicated on the user interface.

13. The computer device according to claim 1 wherein the processor is configured to detect that the blocker spreading mode has been triggered when none of the user activatable game elements of the match condition are located adjacent one or more tiles of the predefined sets of tiles.

14. The computer device according to claim 1 wherein the processor is configured to detect that one or more of the plurality of user activatable game elements of the match condition is adjacent one or more tiles of the predefined sets of tiles which support one or more spreadable blocking elements and to remove said one or more spreadable blocking elements from said adjacent tiles.

15. The computer device according to claim 1 wherein the user interface is configured to provide an initial gameboard in which all tiles of the one or more predefined sets of tiles support spreadable blocking elements.

16. The computer device according to claim 13 wherein the processor is configured to detect an empty set condition in which spreadable blocking elements have been removed from all tiles of a particular predefined set of tiles, to generate a visual animation to indicate the empty set condition, and to trigger effects associated with any game objects supported by the tiles of the particular set.

17. The computer device according to claim 1, wherein the processor is configured to generate a spreadable blocking element as the blocking element for the target tile.

18. A method of operating a computer device comprising a user interface, a processor and computer storage, the method comprising:

providing on the user interface a gameboard comprising a plurality of tiles, each supporting a respective game object, the game objects comprising user activatable game elements of differing characteristics, and blocking elements wherein a blocking element is a displayed game object that is unresponsive to user engagement, the user interface displaying one or more blocking element regions in the gameboard, the one or more blocking element regions respectively including one or more predefined sets of tiles of the plurality of tiles wherein the one or more blocking element regions indicate that the tiles of the blocking element regions are each configured to selectively include a spreadable blocking element and further indicate that other ones of the plurality of tiles outside of the blocking element regions each are prevented from including a spreadable blocking element;

detecting user input at the user interface when a user engages with the user activatable game element in a game move, and performing the following steps by the processor:

receiving a detected user input with one of the user activatable game elements, in response to receiving the detected user input, detecting a match condition of a plurality of the user activatable game elements having matching characteristics, wherein the matching characteristics include at least one of the shapes of the plurality of the user activatable game elements and the colors of the plurality of the user activatable game elements, in response to the detecting the match condition, removing the plurality of the game elements of the match game condition and in response to the removing the plurality of the game elements, generating and displaying new game objects to replenish the gameboard for a next game move, detecting that a blocker spreading mode has been triggered in the game move, selecting an origin tile of the plurality of tiles which supports one of the spreadable blocking elements, identifying a target tile of the plurality of tiles to which the spreadable blocking element may spread by querying a data structure which holds tile data for each tile, wherein the tile data for tiles of the one or more predefined sets of tiles comprises a set indicator which indicates whether a tile is in the, or one of the, one or more predefined sets of tiles available to support a spreadable blocking element, when it is determined from the set indicators for the origin and target tile that they are in the same predefined set of the one or more predefined sets of tiles, generating a new blocking element for the target tile for the next game move; and displaying the new blocking element on the target tile.

19. A non-transitory computer readable medium on which is stored computer readable instructions, which, when executed by one or more processors, implement the steps of the following method:

providing on a user interface a gameboard comprising a plurality of tiles, each supporting a respective game object, the game objects comprising user activatable game elements of differing characteristics, and blocking elements wherein a blocking element is a displayed game object that is unresponsive to user engagement, the user interface displaying one or more blocking element regions in the gameboard, the one or more blocking element regions respectively including one or more predefined sets of tiles of the plurality of tiles wherein the one or more blocking element regions indicate that the tiles of the blocking element regions are each configured to selectively include a spreadable blocking element and further indicate that other ones of the plurality of tiles outside of the blocking element regions each are prevented from including a spreadable blocking element;

detecting user input at the user interface when a user engages with the user activatable game element in a game move, receiving a detected user input with one of the user activatable game elements, in response to receiving the detected user input, detecting a match condition of a plurality of the user activatable game elements having matching characteristics, wherein the matching characteristics include at least one of the shapes of the plurality of the user activatable game elements and the colors of the plurality of the user activatable game elements, in response to the detecting the match condition, removing the plurality of the game elements of the match game condition and in response to the removing the plurality of the game elements, generating and displaying new game objects to replenish the gameboard for a next game move, detecting that a blocker spreading mode has been triggered in the game move, selecting an origin tile of the plurality of tiles which supports one of the spreadable blocking elements, identifying a target tile of the plurality of tiles to which the spreadable blocking element may spread by querying a data structure which holds tile data for each tile, wherein the tile data for tiles of the one or more predefined sets of tiles comprises a set indicator which indicates whether a tile is in the, or one of the, one or more predefined sets of tiles available to support a spreadable blocking element, when it is determined from the set indicators for the origin and target tile that they are in the same predefined set of the one or more predefined sets of tiles, generating a new blocking element for the target tile for the next game move; and displaying the new blocking element on the target tile.

* * * * *